(12) United States Patent
Kong et al.

(10) Patent No.: US 7,466,229 B2
(45) Date of Patent: Dec. 16, 2008

(54) DEVICE FOR GENERATING PLANE BEAM/CONICAL SHAPE BEAM AND SECURITY DEVICE USING GENERATED PLANE BEAM/CONE BEAM

(75) Inventors: Hong Jin Kong, Daejeon (KR); Jin Choi, Seoul (KR)

(73) Assignee: Korea Advance Institute of Science and Technology, Daejeon (KR)

( * ) Notice: Subject to any disclaimer, the term of this patent is extended or adjusted under 35 U.S.C. 154(b) by 426 days.

(21) Appl. No.: 10/554,212

(22) PCT Filed: Apr. 23, 2004

(86) PCT No.: PCT/KR2004/000940

§ 371 (c)(1),
(2), (4) Date: Oct. 24, 2005

(87) PCT Pub. No.: WO2004/095659

PCT Pub. Date: Nov. 4, 2004

(65) Prior Publication Data

US 2006/0208883 A1      Sep. 21, 2006

(30) Foreign Application Priority Data

Apr. 23, 2003  (KR) ............... 10-2003-0025852
May 27, 2003  (KR) ............... 10-2003-0033625
Jul. 15, 2003  (KR) ............... 10-2003-0048207

(51) Int. Cl.
*G08B 13/18* (2006.01)
*G06M 7/00* (2006.01)
*G02B 3/06* (2006.01)
*G02B 5/10* (2006.01)
*G02B 6/00* (2006.01)

(52) U.S. Cl. ............... 340/556; 250/221; 385/122; 359/710; 359/867

(58) Field of Classification Search ......... 340/555–557; 250/221–224; 385/122; 359/710, 867
See application file for complete search history.

(56) References Cited

U.S. PATENT DOCUMENTS

| 2,769,374 | A | * | 11/1956 | Sick ........................... 250/221 |
| 3,771,876 | A | | 11/1973 | Ljungdahl et al. ........... 356/138 |
| 4,520,343 | A | * | 5/1985 | Koh et al. .................... 187/391 |
| 5,321,259 | A | * | 6/1994 | Morgan ....................... 250/236 |
| 5,365,218 | A | | 11/1994 | Otto ............................. 340/557 |
| 5,448,415 | A | * | 9/1995 | Ikeda et al. ................. 359/710 |
| 6,246,502 | B1 | * | 6/2001 | Okada et al. ................ 359/196 |
| 6,583,914 | B1 | * | 6/2003 | Muller et al. ............... 359/212 |

FOREIGN PATENT DOCUMENTS

| JP | 07-168124 | 7/1995 |
| JP | 09-054278 | 2/1997 |

* cited by examiner

*Primary Examiner*—Benjamin C Lee
(74) *Attorney, Agent, or Firm*—Mayer & Williams PC; Stuart H. Mayer, Esq.; Karin L. Willaims, Esq.

(57) ABSTRACT

Disclosed are an apparatus of converting a laser beam traveling straight to a beam propagated in all directions and a security system using the laser beam propagated in all directions. The laser beam traveling straight is incident on a cylindrical prism and repeatedly reflected and transmitted to be converted to the laser beam propagated in all directions. The laser beam is converted to a plane beam or a conical beam by controlling an incident angle of the laser beam incident on the cylindrical prism. The security system is constructed using the apparatus of generating the plane, beam or conical beam.

7 Claims, 41 Drawing Sheets

(a)

(b)

(a)

(b)

(A)

(B)

(C)

DEVICE FOR GENERATING PLANE BEAM/CONICAL SHAPE BEAM AND SECURITY DEVICE USING GENERATED PLANE BEAM/CONE BEAM

TECHNICAL FIELD

The present invention relates to a technique that converts a laser beam traveling straight to a laser beam propagated in all directions and applies the laser beam propagated in all directions to a security system for the purpose of three-dimensional security. More specifically, the present invention relates to an apparatus that inputs a laser beam traveling straight into a cylindrical prism such that the laser beam is repeatedly transmitted and reflected inside the cylindrical prism to generate a laser beam propagated in all directions through the outer surface of the cylindrical prism, and controls an incident angle of the laser beam traveling straight to generate a plane beam or a conical beam, and a security system employing the laser beam generating apparatus.

BACKGROUND ART

While a laser beam propagated in all directions is required, there is no apparatus for generating the laser beam up to now. It is expected that the apparatus for generating the laser beam propagated in all directions is applied to a variety of applications if the apparatus could be realized. One of the applications is a security system. For security of a wide space, a plurality of devices of generating laser beams traveling straight should be installed at present. However, if there exists a device of generating a plane beam or a conical beam, which is provided by the present invention, the wide space can be easily monitored only with a small number of laser beam generating devices.

Security becomes increasingly important in these days. For instance, it is difficult to prevent an intruder who attempts to access a building or other security areas. As a technique of protecting the security areas is developed, attempts to break a security system become diversified. Accordingly, a system capable of detecting an intruder in the security areas is urgently required.

One of security systems is disclosed in U.S. Pat. No. 4,949,074, which projects a beam of infrared radiation and receives the radiation of the reflected beam. Furthermore, U.S. Pat. No. 3,715,953 discloses a regional security and fire prevention system including a laser range finder. However, this system has a small security area because the security area is limited to a range in which a laser beam is projected and returned. Thus, a plurality of laser beams traveling straight should be used in order to widen the security area.

U.S. Pat. No. 4,939,379 discloses a system that scans the surface of a target and measures the contour of the surface. However, this system requires a device of rotating a laser beam because it scans the entire security area with the laser beam. One of intrusion detection systems is disclosed in U.S. Pat. No. 5,365,218. The disclosed system includes a laser device set in a rotating apparatus and needs a motor for rotating the laser device to scan a security area and other components for the rotation. This increases the volume and cost of the security system and makes maintenance of the system difficult.

DISCLOSURE OF INVENTION

An object of the present invention is to provide an apparatus for generating a plane beam propagated in all directions.

Another object of the present invention is to provide an apparatus for generating a conical beam propagated in all directions.

Yet another object of the present invention is to provide a security system using the plane beam generated by the plane beam generating apparatus.

Still another object of the present invention is to provide a security system using the conical beam generated by the conical beam generating apparatus.

The present invention proposes a cylindrical prism as an essential optical element of the apparatus for generating the plane beam or conical beam. The present invention also proposes a condition for generating the plane beam and conical beam.

To accomplish the objects of the present invention, there is provided a plane beam generating apparatus using a cylindrical prism, which includes a hollow cylindrical prism with a predetermined diameter; and a laser beam generator for emitting a laser beam to the outer surface of the cylindrical prism. The laser beam generator is arranged such that the laser beam generated by the laser beam generator is incident on the outer surface of the cylindrical prism, perpendicularly to the central axis of the cylindrical prism. A part of the laser beam incident on the cylindrical prism is reflected from the outer surface of the cylindrical prism, and the remaining part of the laser beam is repeatedly reflected from the outer surface and the inner face of the cylindrical prism and repeatedly transmitted through the cylindrical prism, to generate a plane beam propagated in all directions of 360° on an arbitrary plane in the radius direction of the cylindrical prism.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

The present invention will now be described in detail in connection with preferred embodiments with reference to the accompanying drawings.

The present invention requires an apparatus of generating a laser beam traveling straight and a cylindrical prism in order to generate a plane beam or a conical beam that is propagated in all directions. In addition, the present invention also requires a device for fixing the laser beam generating apparatus and the cylindrical prism. The fixing device is well known in the art so that explanation therefor is omitted.

Figure 1:
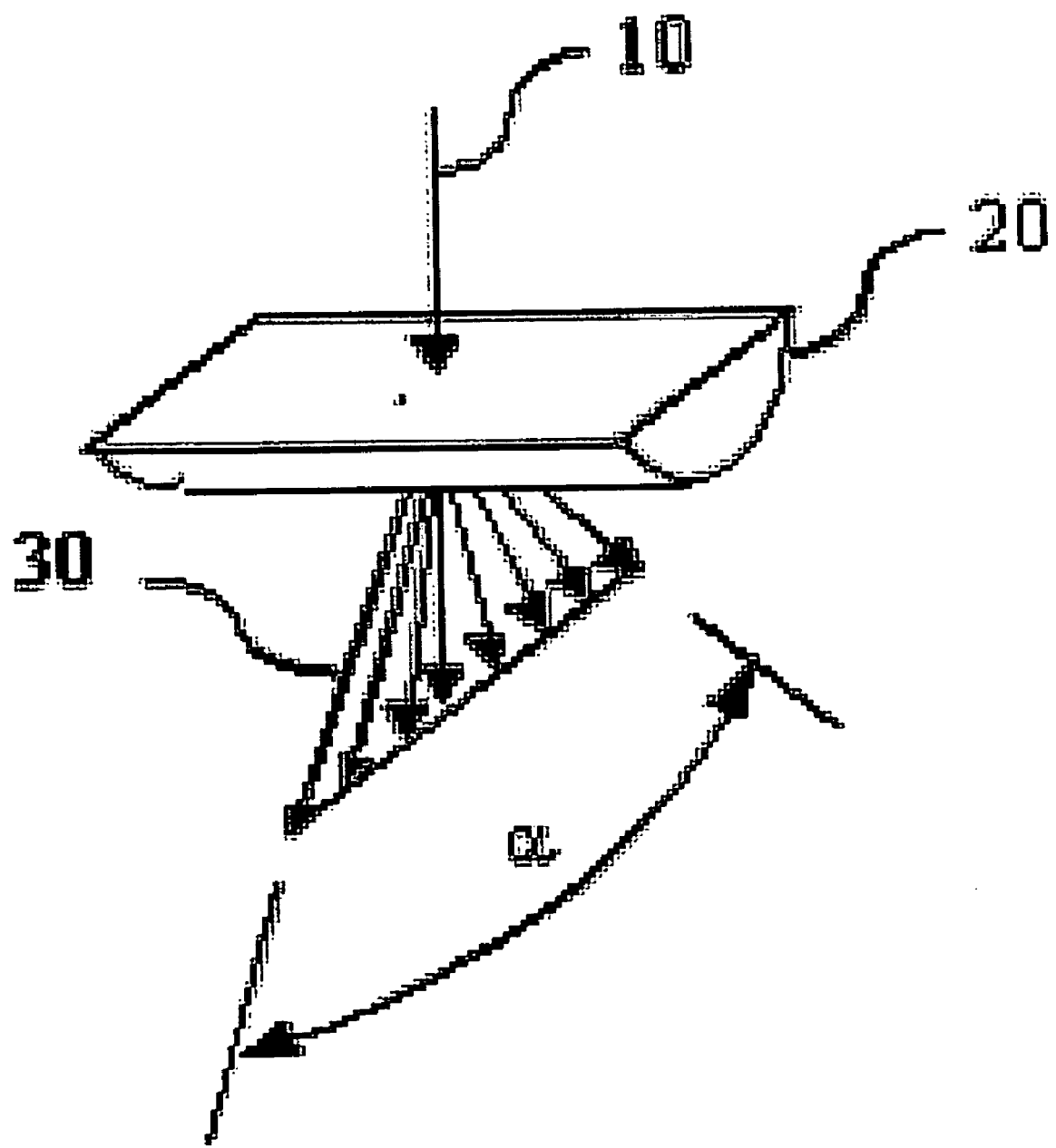
FIG. 1 shows dispersion of a laser beam.

Before the explanation of apparatuses for generating a plane beam and a conical beam propagated in all directions, a conventional method of generating a laser beam traveling straight while being propagated at a specific angle is described. To obtain the laser beam traveling straight while being propagated at a specific angle, a half-cylindrical optical element is used. FIG. 1 shows a method of obtaining a laser beam propagated at a specific angle from a laser beam traveling straight. When a laser beam 10 is input into a half-cylindrical lens 20, the laser beam 10 is transmitted and refracted in the lens 20 to be converted to a laser beam 30 propagated at a specific angle. The angle is decided by the radius of curvature and material of the lens. The angle is less than 90°, in general.

An apparatus for generating a plane beam propagated in all directions will now be explained with reference to FIG. 2.

The plane beam generating apparatus includes a cylindrical prism 100 having a central hole and a laser beam generator 40. The outer surface 101 and inner face 102 of the cylindrical prism 100 are coated in order to control transmittance T and reflectance R. The transmittance T and the reflectance R are decided according to the coating. T+R=1 when the medium of the cylindrical prism does not absorb a laser beam. Factors that affect the behavior of the laser beam that is input into the cylindrical prism include reflection, Snell's law, reflection, refraction, transmittance and reflectance according to Fresnel equation. The behavior of the plane beam is decided by the correlation of these factors.

Figure 2:
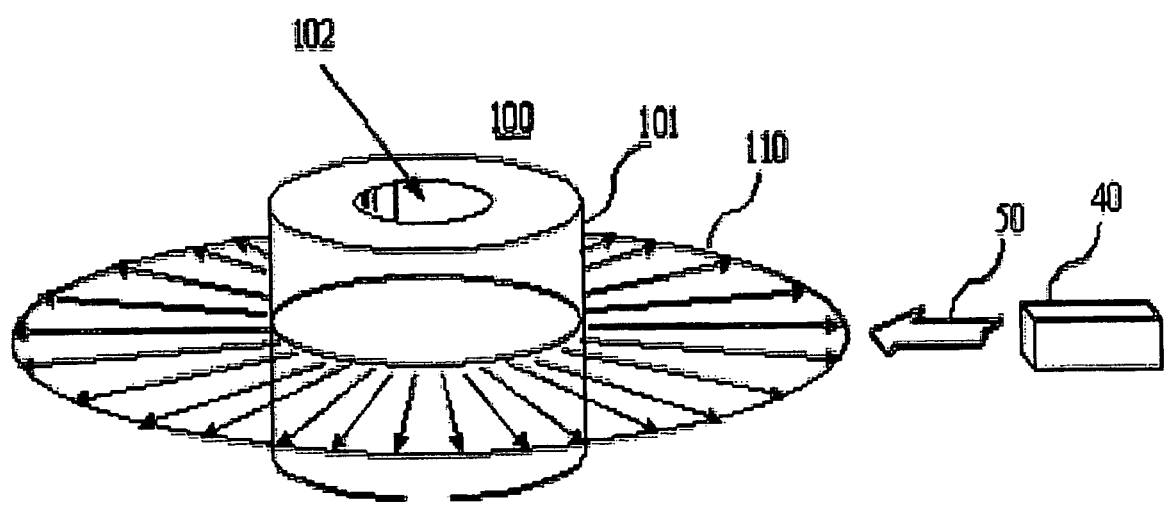
FIG. 2 shows a plane beam that is propagated in all directions on an arbitrary plane using a cylindrical prism.

As shown in FIG. 2, when a laser beam 50 generated by the laser beam generator 40 is perpendicularly incident on the outer surface 101 of the cylindrical prism 100, the laser beam 50 is repeatedly transmitted in the cylindrical prism and repeatedly reflected from the outer surface 101 and the inner face 102 while passing through the cylindrical prism 100 to be converted to a plane beam propagated at 360° in the radius direction of the cylindrical prism 100.

Figure 3A:
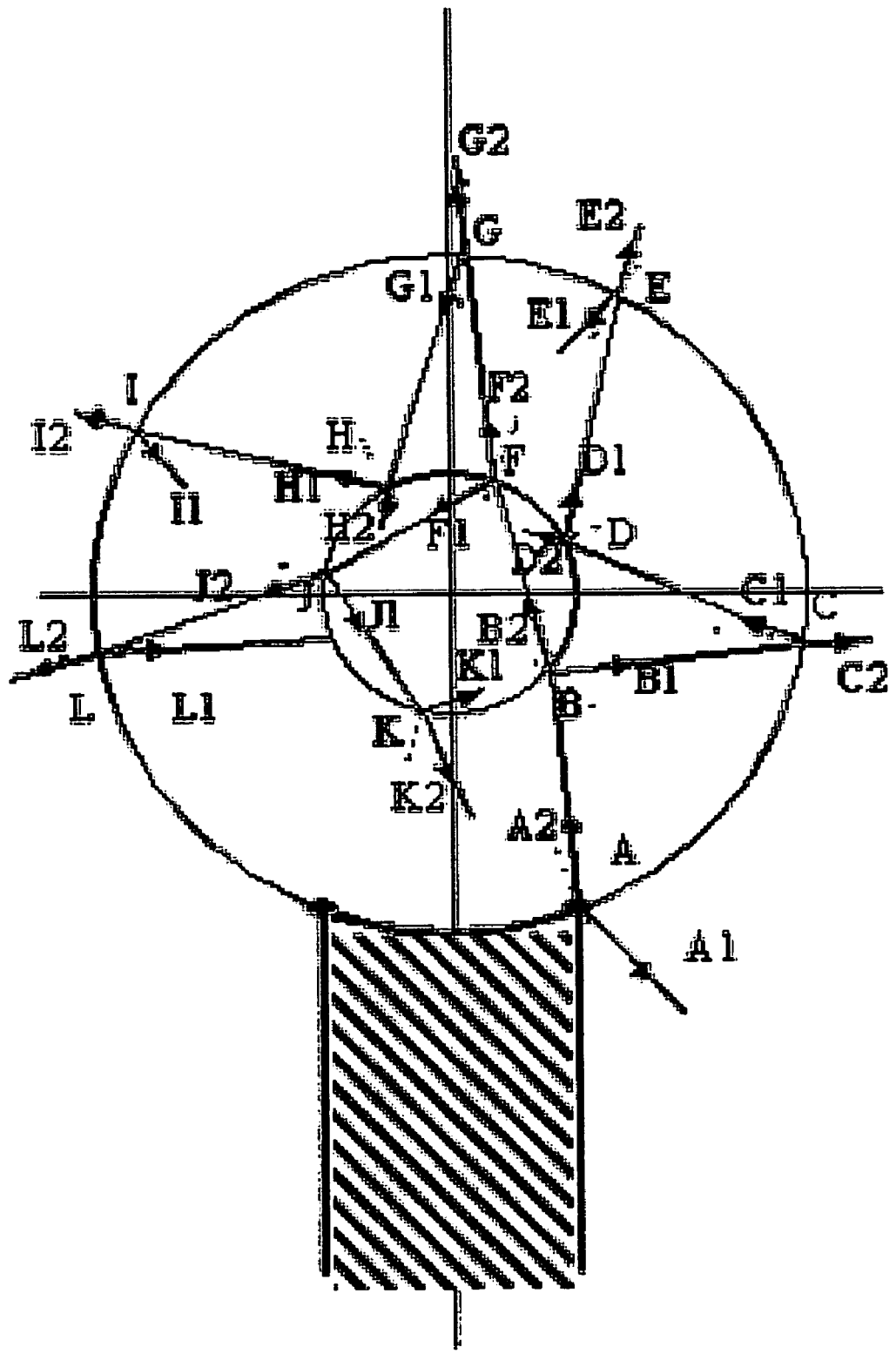
FIGS. 3 and 4 show behaviors appearing when a laser beam is incident on a cylindrical prism.
Figure 3B:
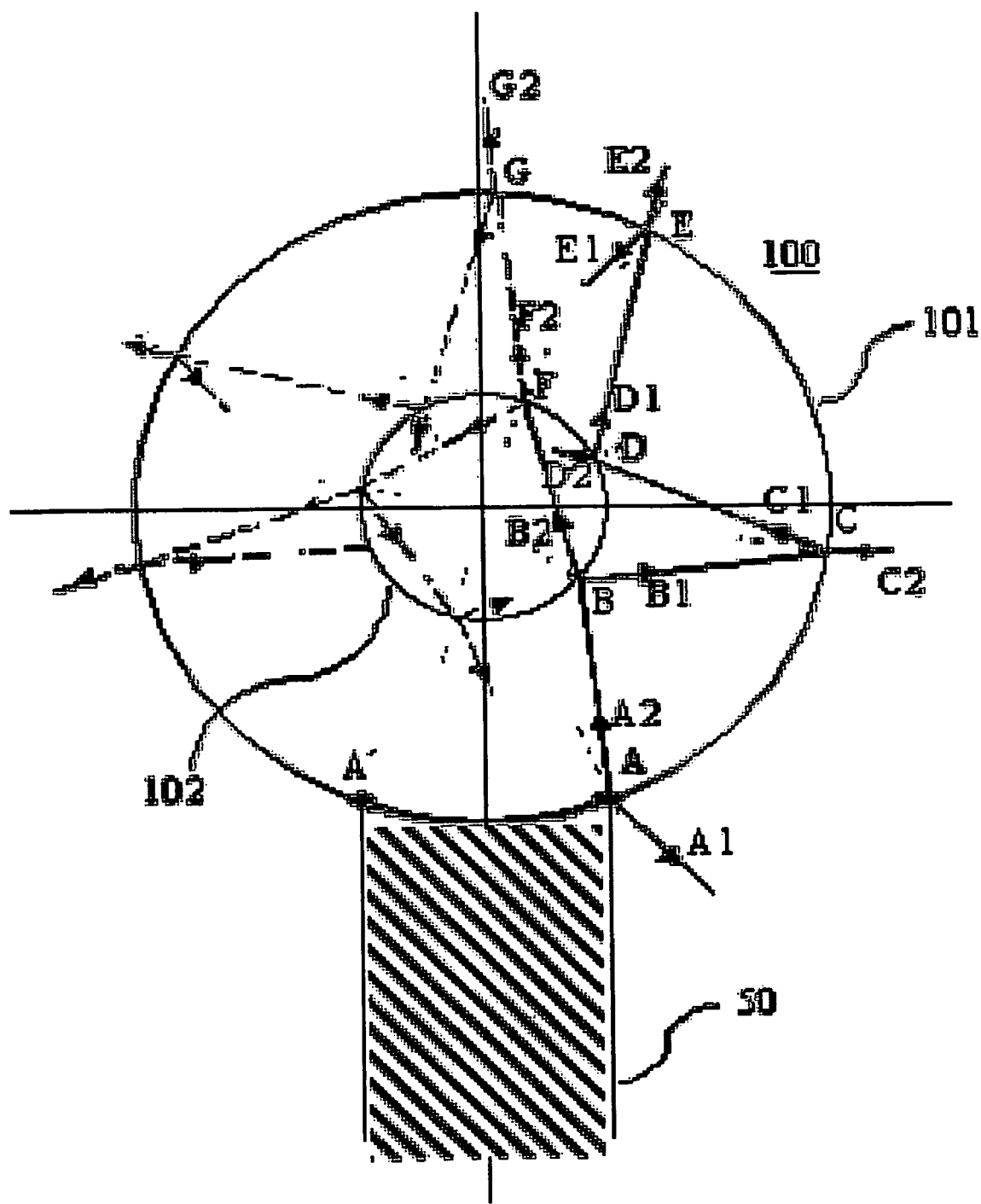

FIGS. 3a through 3e are plan views of the cylindrical prism, which show that the outermost part of the laser beam 50 is input into the cylindrical prism and repeatedly transmitted and reflected. FIG. 3b shows that the outermost part of the laser beam 50 is incident on a point A on the outer surface 101 of the cylindrical prism 100 and propagated. In FIG. 3b, the laser beam incident on the point A is partially reflected according to the reflective law and partially transmitted. A reflected beam A1 and a transmitted beam A2 are shown in FIG. 3b. The reflective law and transmission law are well known in the art so that explanation for the reflection and transmission of the laser beam at the point A are omitted. The beam A2 transmitted through the point A travels straight in the cylindrical prism to arrive at a point B on the inner face 102 of the cylindrical prism. At the point B, the transmitted beam A2 is divided into a beam B1 reflected to the inside of the cylindrical prism and a beam B2 transmitted through the air. The reflected beam B1 is propagated in the medium of the cylindrical prism to pass through a point C. At the point C, the reflected beam B1 is divided into a transmitted beam C2 and a reflected beam C1. The transmitted beam C2 is propagated in the air, and the reflected beam C1 is propagated in the medium of the cylindrical prism and passes through a point D. At the point D, the reflected beam B1 is divided into a transmitted beam D2 and a reflected beam D1. The reflected beam D1 is propagated in the medium of the cylindrical prism to pass through a point E. At the point E, the reflected beam D1 is split into a reflected beam E1 and a transmitted beam E2. In this manner, a laser beam (including the transmitted beams C2 and E2) that is propagated in the air is generated. The propagation direction of the laser beam corresponds to the radius direction of the cylindrical prism.

A laser beam incident on a point A' opposite to the point A is propagated according to the same process as the aforementioned process. Furthermore, all of the parts of the laser beam 50 between the points A and A' are propagated in all directions of 360° of an arbitrary plane 110 (shown in FIG. 2) in the radius direction of the cylindrical prism through the aforementioned process.

Figure 3C:
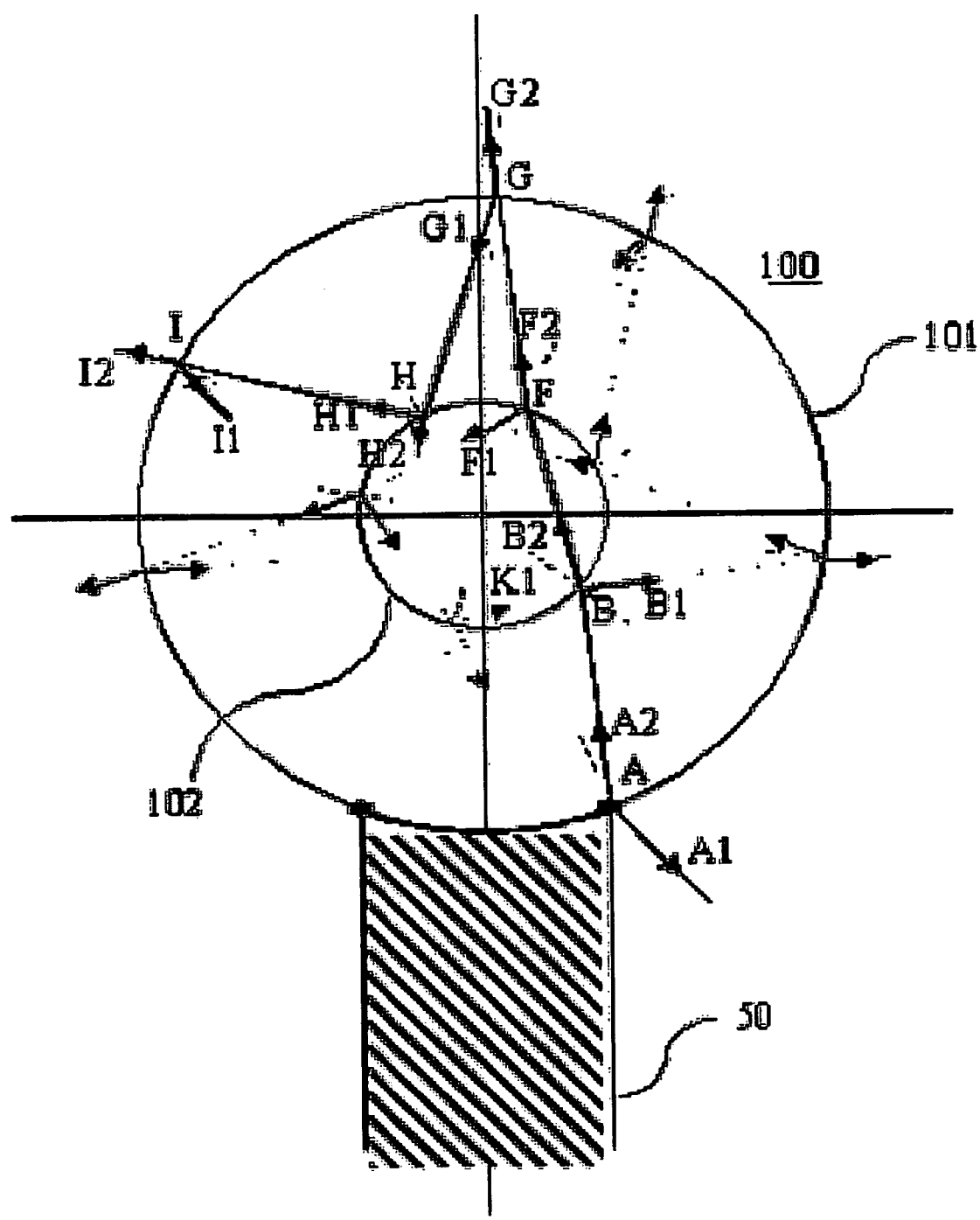

FIG. 3c shows the behavior of a laser beam incident on the point B and a point F. The beam B2, transmitted through the point B, passes through the point F to be divided into a transmitted beam F2 and a reflected beam F1. The transmitted beam F2 is propagated in the medium of the cylindrical prism and divided into a transmitted beam G2 and a reflected beam G1 at a point G. The transmitted beam G2 is propagated on the plane 110 located in the radius direction of the cylindrical prism, and the reflected beam G1 is propagated in the medium of the cylindrical prism to be divided into a transmitted beam H2 and a reflected beam H1 at a point G. The reflected beam H1 is divided into a transmitted beam I2 and a reflected beam I1 at a point I. The transmitted beam I2 is also propagated on the plane 110 placed in the radius direction of the cylindrical prism.

Figure 3D:
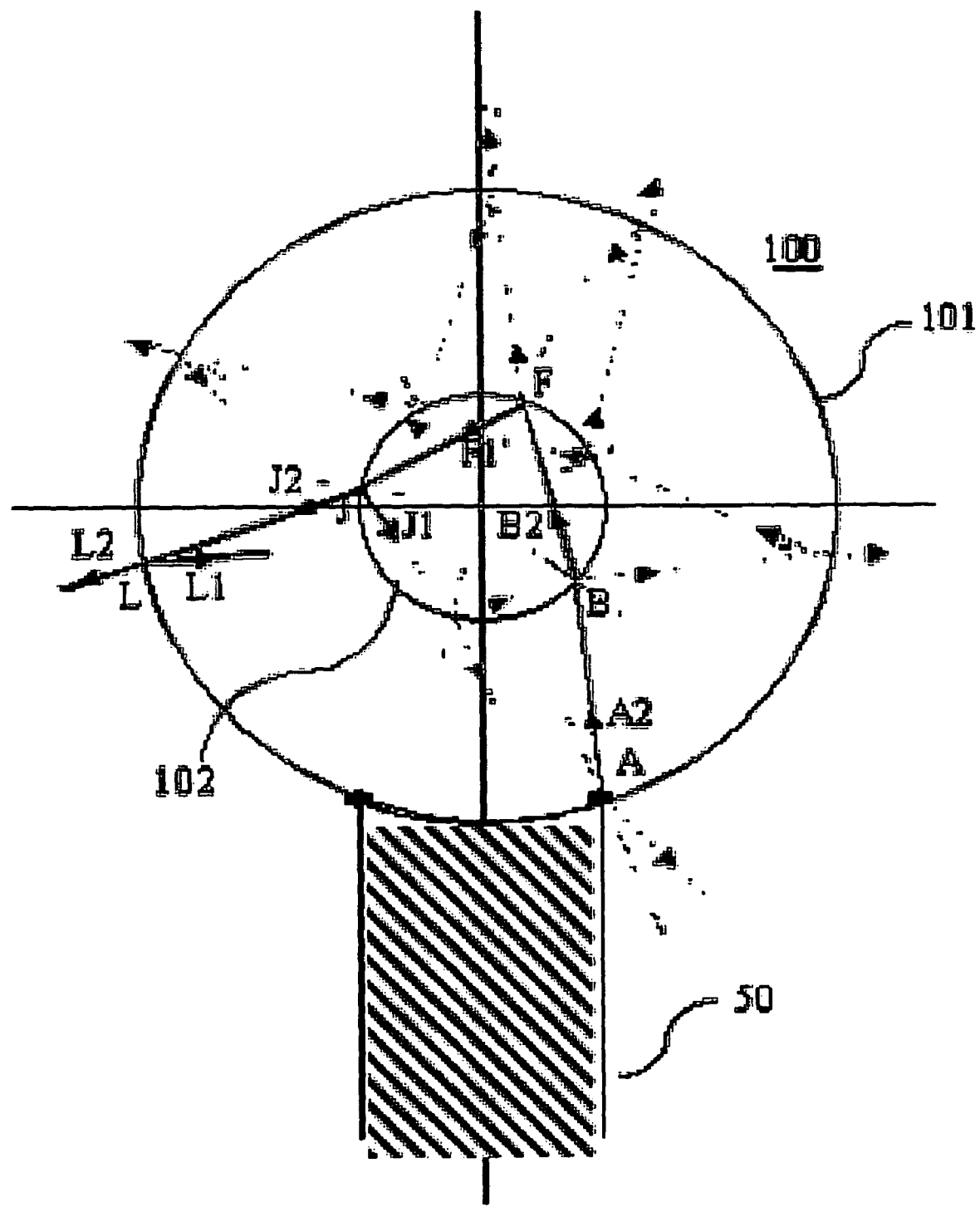
Figure 3E:
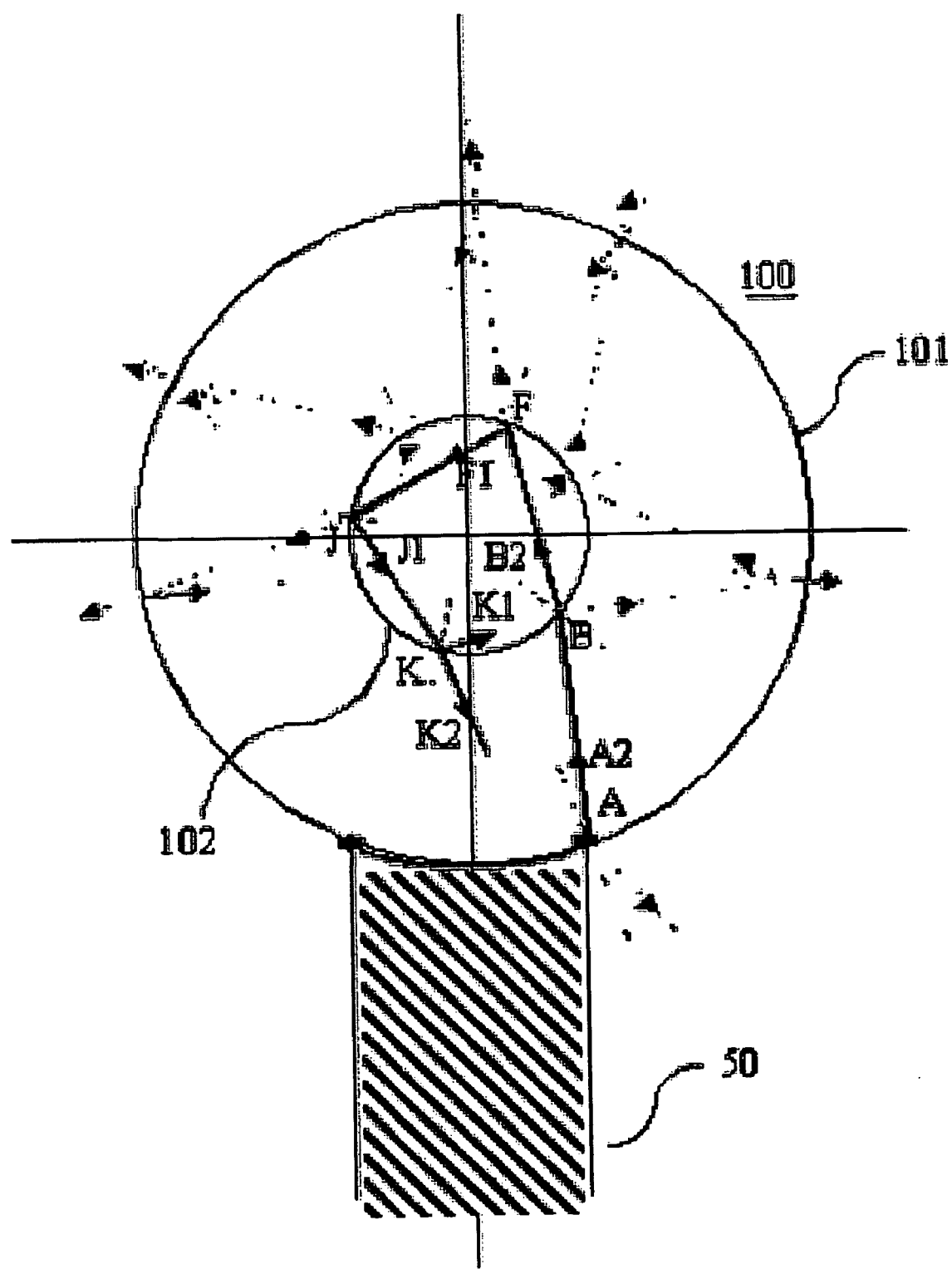

FIG. 3d shows the behavior of a laser beam that is incident on points J and L, and FIG. 3e shows that a beam J1 reflected at the point J is divided into a transmitted beam K2 and a reflected beam K1 at a point K.

Figure 4:
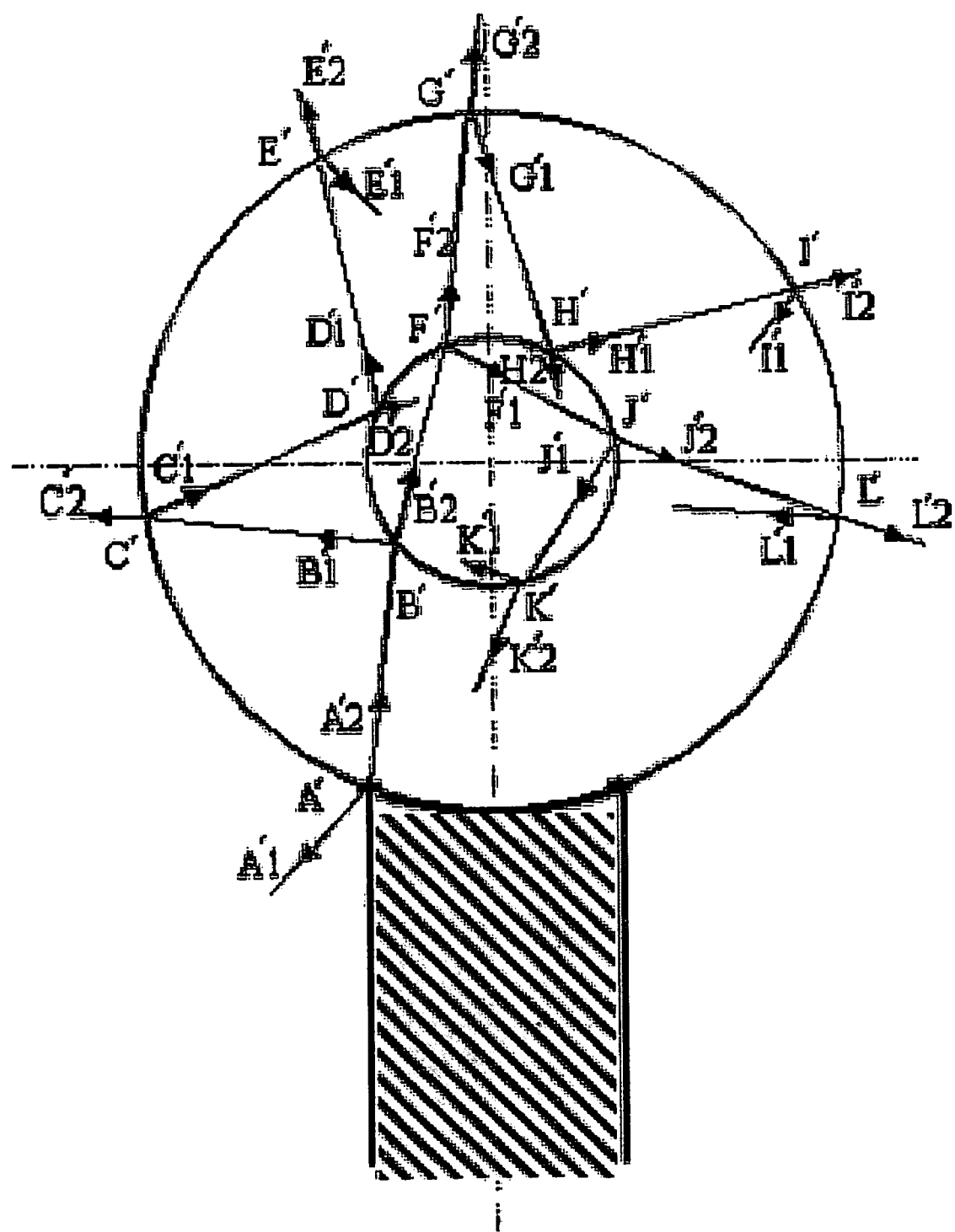

FIG. 4 shows the behavior of a beam incident on the point A' opposite to the point A. The propagation processes of the beams shown in FIGS. 3a and 4 are symmetrical because the points A and A' are opposite to each other. Here, A', B', C', D', E', F', G', H', I', J' and K' respectively correspond to A, B, C, D, E, F, G, H, I, J and K.

Figure 5:
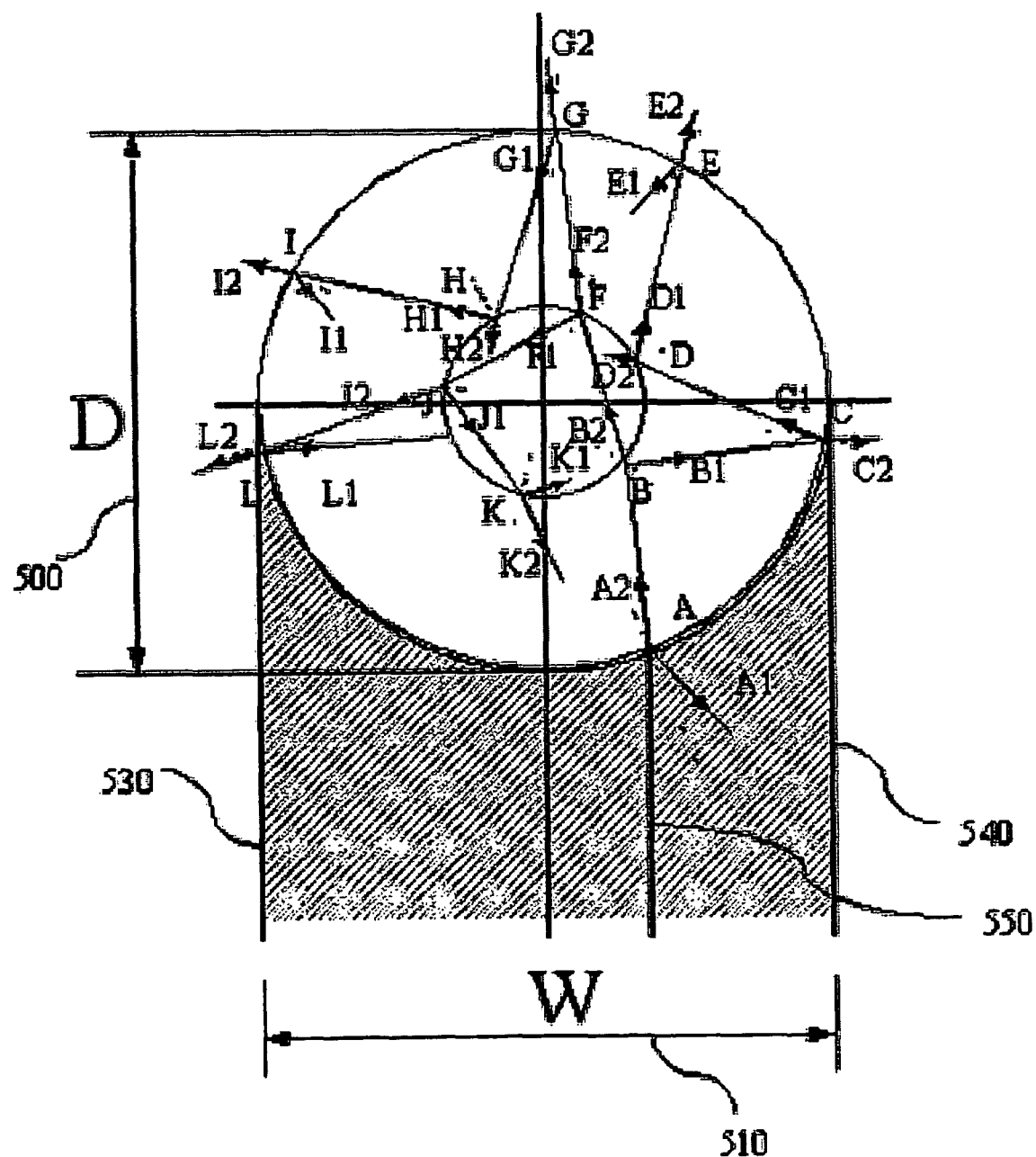
FIG. 5 shows the relationship between the width of a laser beam and a diameter of the outer surface of a cylindrical prism.

FIG. 5 shows the diameter D 500 of the outer surface of the cylindrical prism and the width W 510 of the laser beam. The width of the laser beam is identical to the diameter of the cylindrical prism. The outermost lines 530 and 540 of the laser beam are shown as if they are tangent lines of the outer surface of the cylindrical prism. From the result of a simulation using well-known software when the ratio of the reflectance to transmittance of the outer and inner faces of the cylindrical prism is 1:1, it can be confirmed that the intensity of the plane beam propagated in all directions of 360° has a small deviation for all directions when the width of the laser beam is identical to the diameter of the outer surface of the cylindrical prism. Though this result can be varied with a change in the reflectance and transmittance of the outer and inner faces of the cylindrical prism, the variation is negligible. Consequently, a deviation of the intensity of the plane beam propagated in all direction of 360° becomes smaller as the width of the laser beam becomes closer to the diameter of the outer surface of the cylindrical prism. A process of making the laser beam have a specific width will be explained later with reference to FIG. 10b.

FIG. 6 shows reflectances R1 and R2 of a P-polarized beam and an S-polarized beam.

The behavior of the beams will be confirmed using a ray tracing method while changing variables, and a condition required for the intensity of the laser beam to be uniformly distributed in all directions of 360° will be found out.

The ray tracing method traces a beam passing through an optical system. Specifically, reflection and refraction of an incident beam (laser beam) on a first surface having a different refractive index are decided by Snell's refraction equation. The beam reflected or refracted from the first surface is arrived at a second surface to be reflected or refracted from the second surface. In this manner, whenever the beam reaches a new surface, it is reflected or refracted from the surface to generate a new beam. If the beam does not meet any new surface any more, the beam does not generate a new beam. This may occurs infinitely in a certain case. At this time, the intensity of the beam weakens due to reflection and refraction. In this case, tracing of the beam is stopped when the intensity of the beam becomes lower than a predetermined level so that the traced result can be confirmed.

The present invention calculated the distribution of a plane beam propagated in all directions of 360° for a plane located in the radius direction of the cylindrical prism by tracing propagation of incident beams using the above-described method.

For the ray tracing, a screen diameter was set to 1000 mm (a distance in which all beams can be traced at an interval of 1°), and the diameters of the outer and inner faces of the cylindrical prism were respectively set to 2.625 mm and 1.400 mm. A P-polarized beam, an S-polarized beam and a non-polarized beam ((P-polarized beam+S-polarized beam)/2) were used as incident laser beams. The widths of the laser beams were set to 100%, 80%, 60%, 40% and 20% of the diameter of the outer surface of the cylindrical prism. Here, P-polarization means that electromagnetic waves are linear-polarized in parallel with an incident plane when the electromagnetic waves are incident on a certain system, and S-polarization means that the electromagnetic waves are linear-polarized perpendicularly to the incident plane. The non-polarized beam means a mixed beam of the P-polarized beam and the S-polarized beam.

Reflectances on a glass surface depending on the polarization of a beam are defined as R1 and R2. Here, R1 is a reflectance when the beam is incident on the incident surface at 0°, that is, when the beam is perpendicularly incident on the incident surface, and R2 is a reflectance at Brewster angle (56°).

Reflectances of the incident laser beams, selected for a simulation, were set as follows.

P-polarization (R1, R2)%: (4, 0)%, (20, 0)%, (20, 10)%, (30, 10)%, (30, 10)%, (30, 20)%, (40, 0)%, (40, 10)%, (40, 20)%, (40, 30)%, (50, 0)%, (50, 10)%, (50, 20)%, (50, 30)%, (50, 40)%

S-polarization (R1, R2)%: (4, 15)%, (20, 30)%, (20, 40)%, (30, 40)%, (30, 50)%, (40, 50)%, (40, 60)%, (50, 60)%, (50, 70)%

Non-polarization (R1, R2)%: (4, 7.5)%, (20, 20)%, (30, 30)%, (40, 40)%, (50, 50)%

Figure 6A:
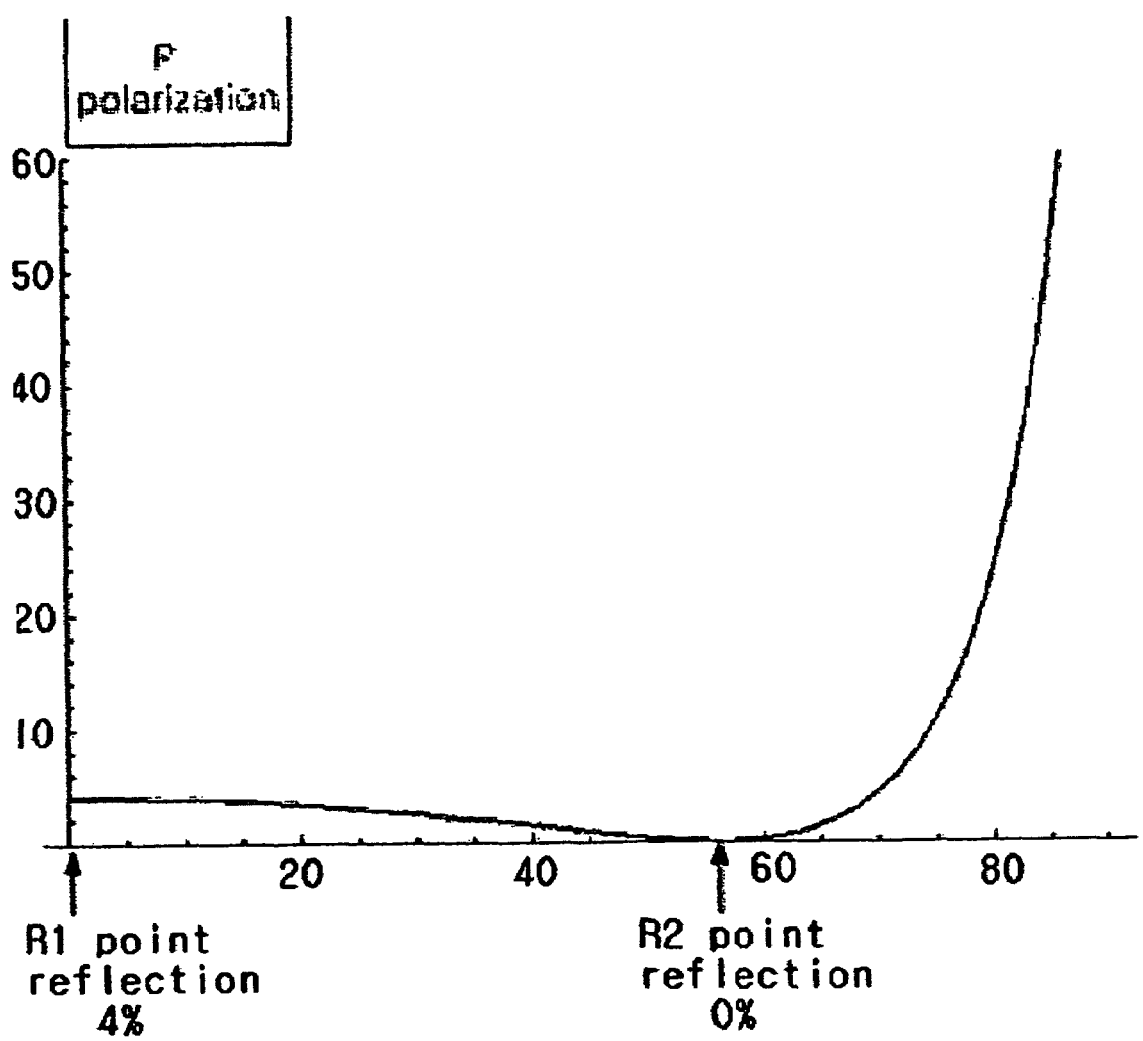
FIG. 6 shows reflectances R1 and R2 in the case of P-polarization and S-polarization.
Figure 6B:
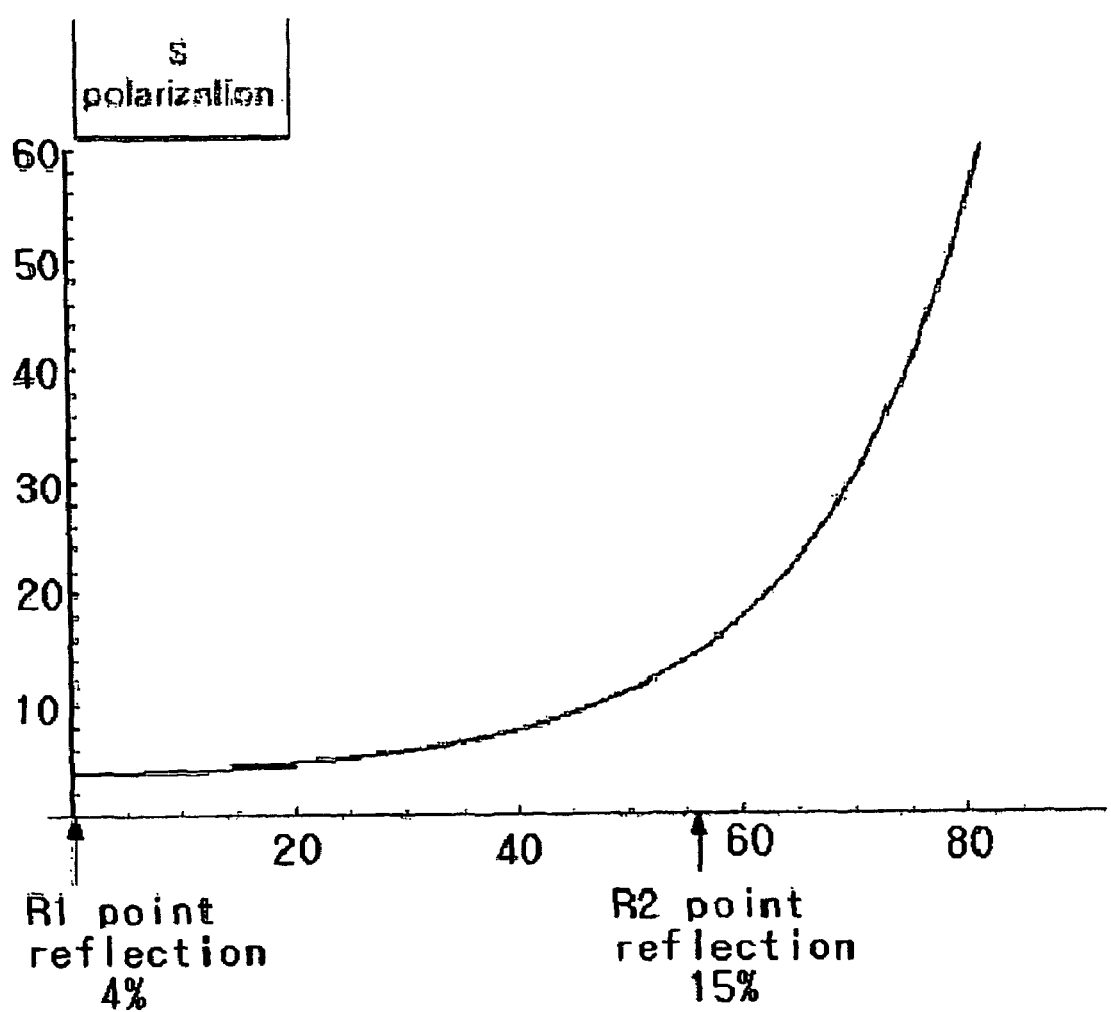

For example, P-polarization (4, 0)% means that reflectances R1 and R2 of a P-polarized beam reflected from the incident surface are respectively 4% and 0% depending on incident angles of the P-polarized beam to the cylindrical prism, as shown in FIG. 6a. S-polarization (4, 15)% represents that reflectances R1 and R2 of an S-polarized beam reflected from a glass tube are respectively 4% and 15% depending on incident angles of the S-polarized beam to the glass tube, as shown in FIG. 6b. Non-polarization (4, 7.5%) represents that reflectances R1 and R2 of a beam having a P-polarized beam and an S-polarized beam uniformly mixed with each other, which is reflected from the incident surface, are respectively 4% and 7.5% depending on incident angle of the beam to the cylindrical prism.

As described above, there are fifteen kinds of laser beams depending on reflectances of a P-polarized beam for the P-polarization. The width of each of the laser beams was set to 100%, 80%, 60%, 40%, 20% and 5% of the diameter of the outer surface of the cylindrical prism and ray tracing was carried out for the laser beam. For the S-polarization, there are nine kinds of laser beams. The width of each of the laser beams was set to 100%, 80%, 60%, 40%, 20% and 5% of the diameter of the outer surface of the cylindrical prism and ray tracing was carried out for the laser beam. For the non-polarization, there are five kinds of laser beams depending on reflectances of a non-polarized beam. The width of each of the laser beams was set to 100%, 80%, 60%, 40%, 20% and 5% of the diameter of the outer surface of the cylindrical prism and ray tracing was carried out for the laser beam.

In the aforementioned simulation, it is assumed that a laser beam incident on the cylindrical prism includes one hundred beams that have the same intensity over the entire width of the laser beam and start from the same plane. In addition, it is assumed that all of the beams are perpendicularly incident on the outer surface of the cylindrical prism, the refractive index of the cylindrical prism is 1.50, and the outer and inner faces of the cylindrical prism have a perfect round shape.

From the simulation of inputting the laser beam to the cylindrical prism while changing the reflectance and width of the laser beam to generate a plane beam propagated in all directions of 360° and confirming the distribution of the plane beam, the following results were obtained.

The intensity of the plane beam was uniformly distributed in all directions of 360° when the width of the laser beam approximated to the diameter of the outer surface of the cylindrical prism. In the case of P-polarization, the intensity of the plane beam was uniformly distributed in all directions of 360° when reflectances R1 and R2 were (40, 30)%, (50, 20)% and (50, 40)%. In the case of S-polarization, the intensity of the plane beam was uniformly distributed in all directions of 360° when reflectances R1 and R2 were (30, 40)%, (30, 50)%, (40, 50)%, (40, 60)% and (50, 70)%. In the case of non-polarization, the intensity of the plane beam was uniformly distributed in all directions of 360° when reflectances R1 and R2 were (40, 40)% and (50, 50)%.

FIGS. 7 through 9 show the results of the above-described simulation when the width of the laser beam approximates to the diameter of the outer surface of the cylindrical prism, that is, when the width of the laser beam corresponds to 99.9% of the diameter of the outer surface.

Figure 7A:
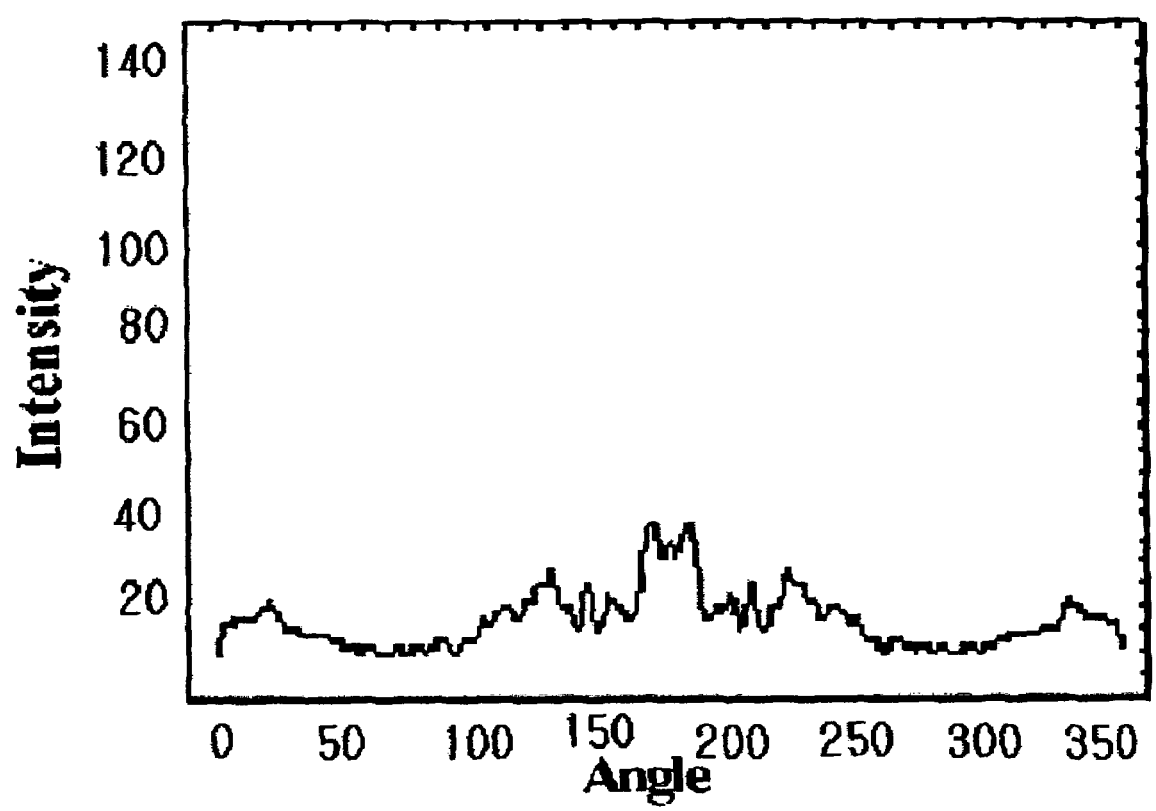
FIG. 7a shows the intensity of a plane beam depending on angles when an incident laser beam is a P-polarized beam and reflectances are (40, 30)%.
Figure 7B:
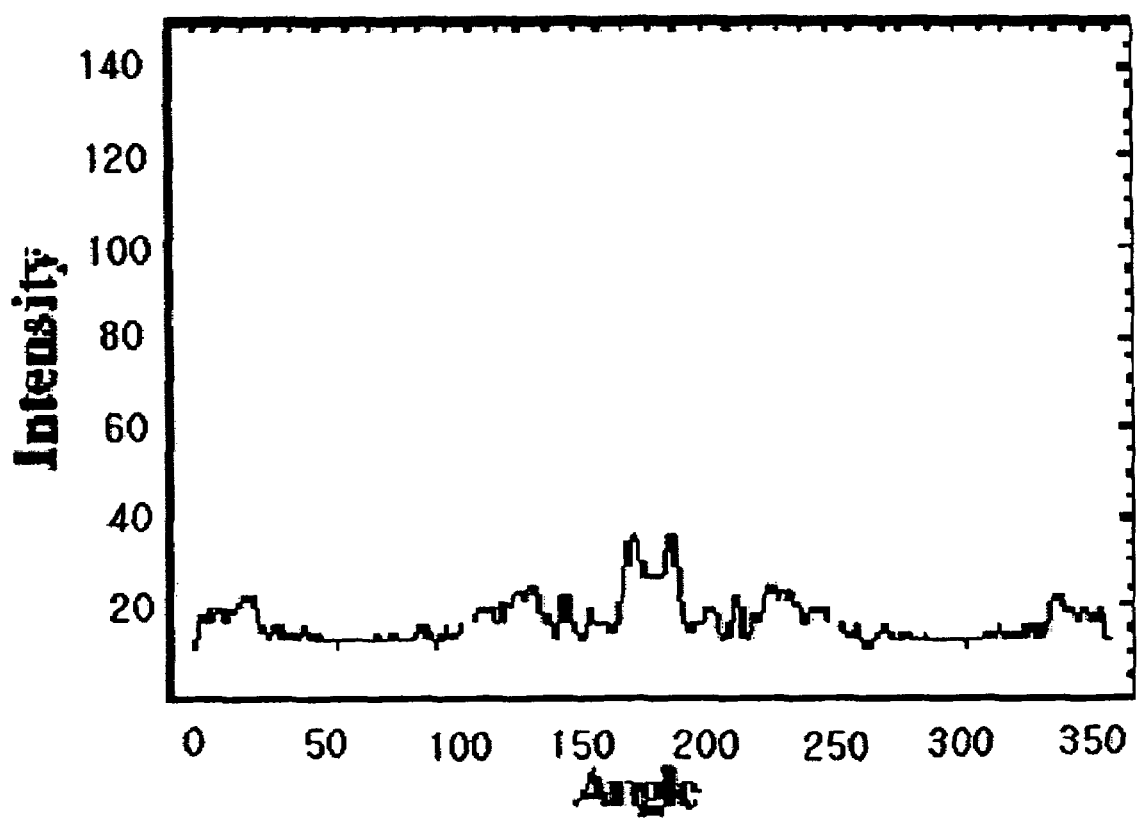
FIG. 7b shows the intensity of the plane beam depending on angles when the incident laser beam is a P-polarized beam and reflectances are (50, 20)%.
Figure 7C:
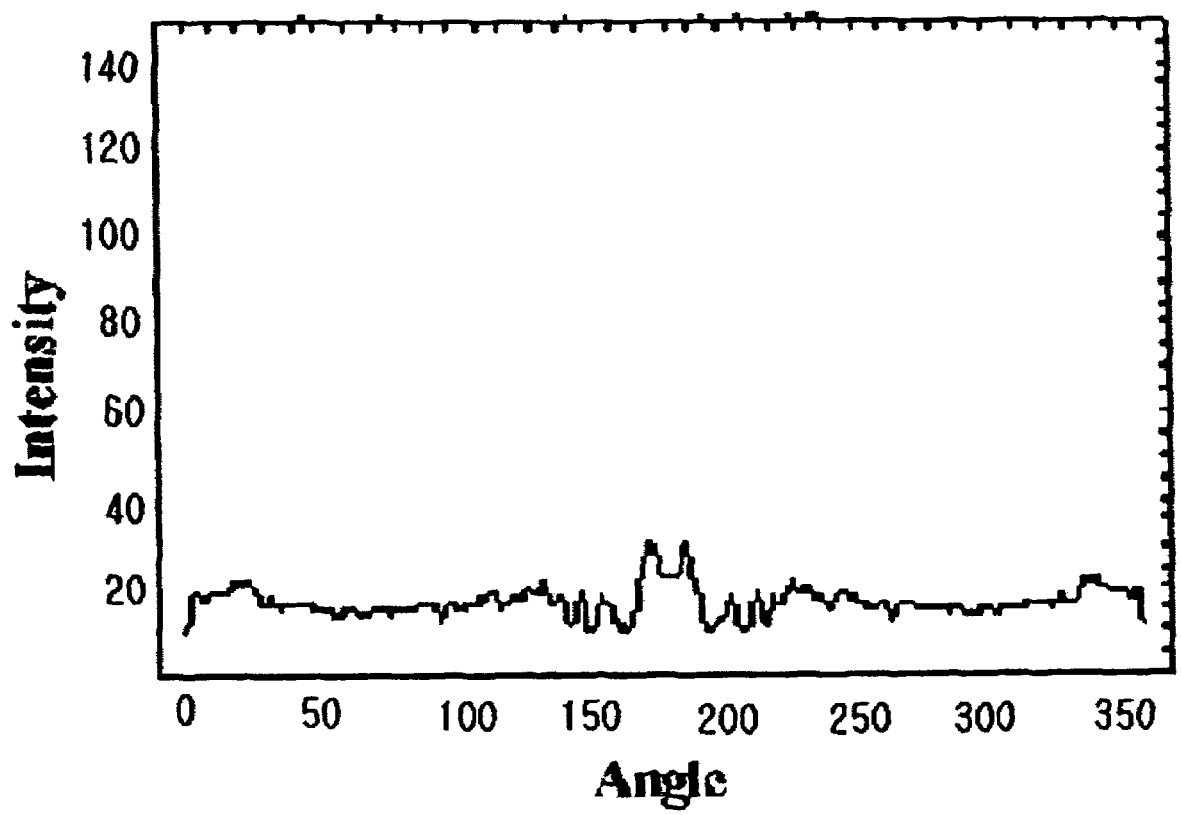
FIG. 7c shows the intensity of the plane beam depending on angles when the laser beam is a P-polarized beam and reflectances are (50, 40)%.

FIG. 7a shows the intensity of the plane beam depending on angles when the laser beam is a P-polarized beam and reflectances are (40, 30)%. FIG. 7b shows the intensity of the plane beam depending on angles when the laser beam is a P-polarized beam and reflectances are (50, 20)%. FIG. 7c shows the intensity of the plane beam depending on angles when the laser beam is a P-polarized beam and reflectances are (50, 40)%.

Figure 8A:
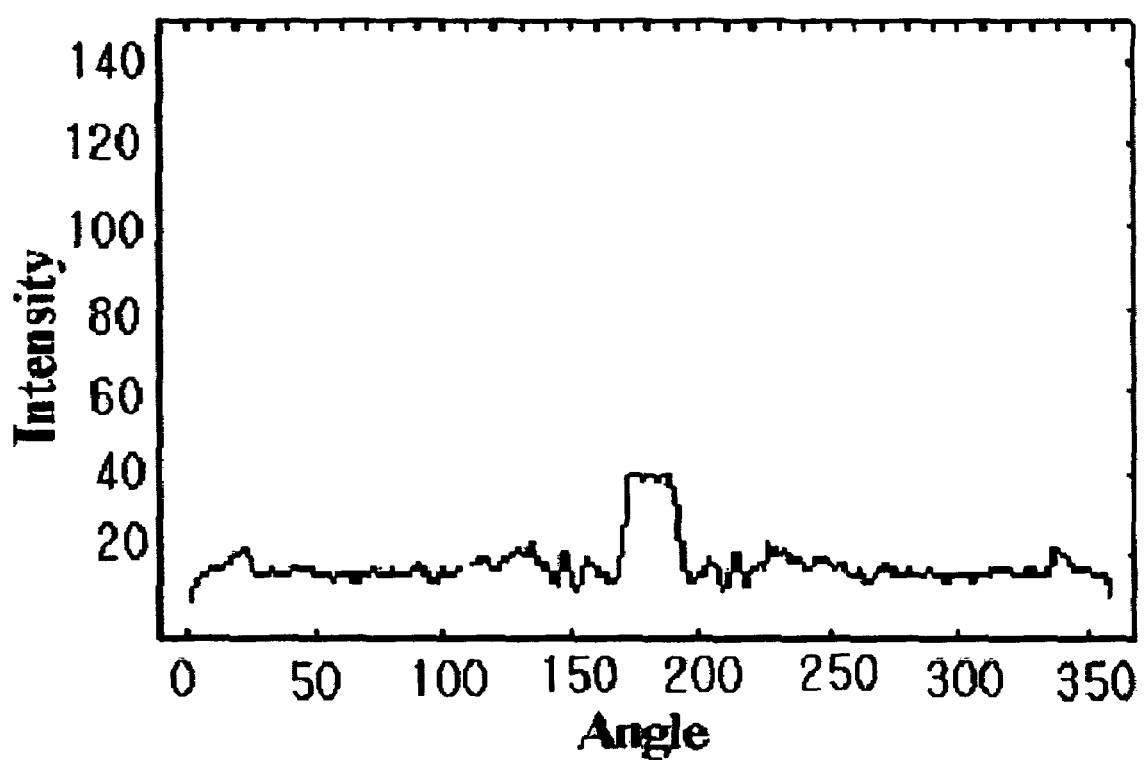
FIG. 8a shows the intensity of the plane beam depending on angles when the laser beam is an S-polarized beam and reflectances are (30, 40)%.
Figure 8B:
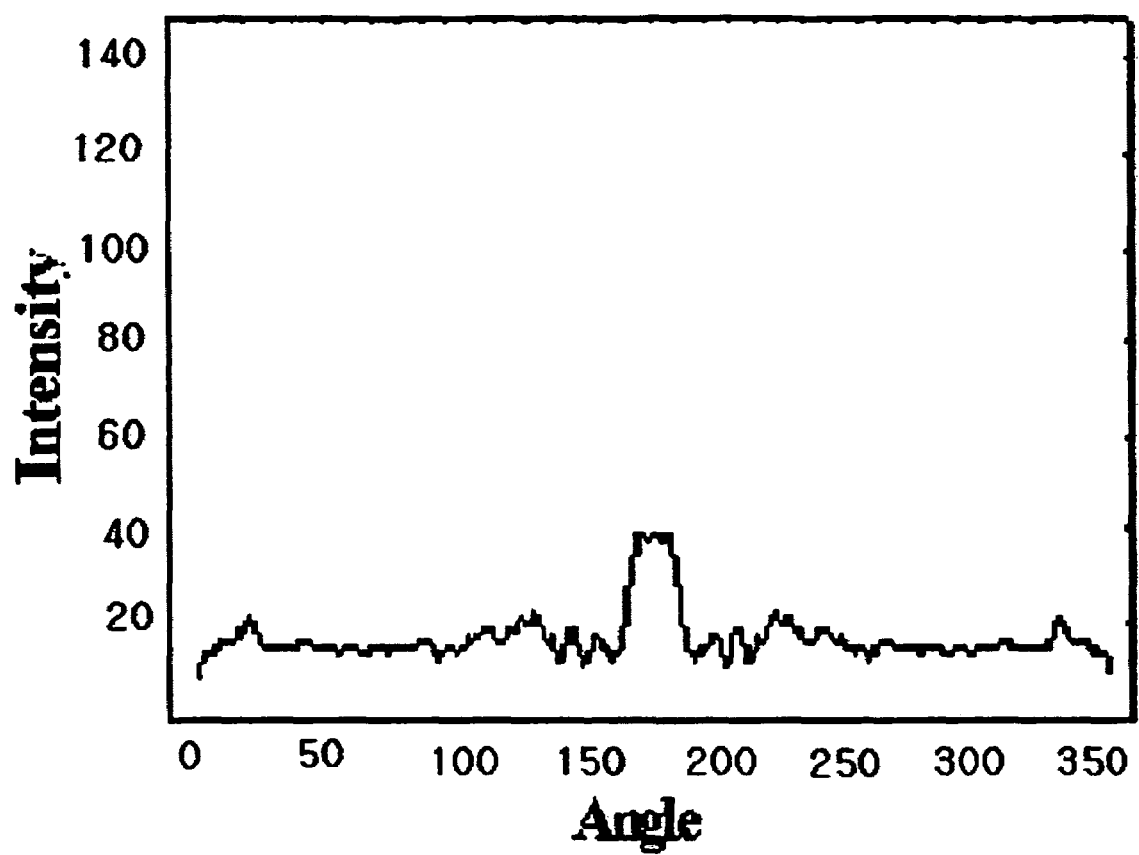
FIG. 8b shows the intensity of the plane beam depending on angles when the laser beam is an S-polarized beam and reflectances are (30, 50)%.
Figure 8C:
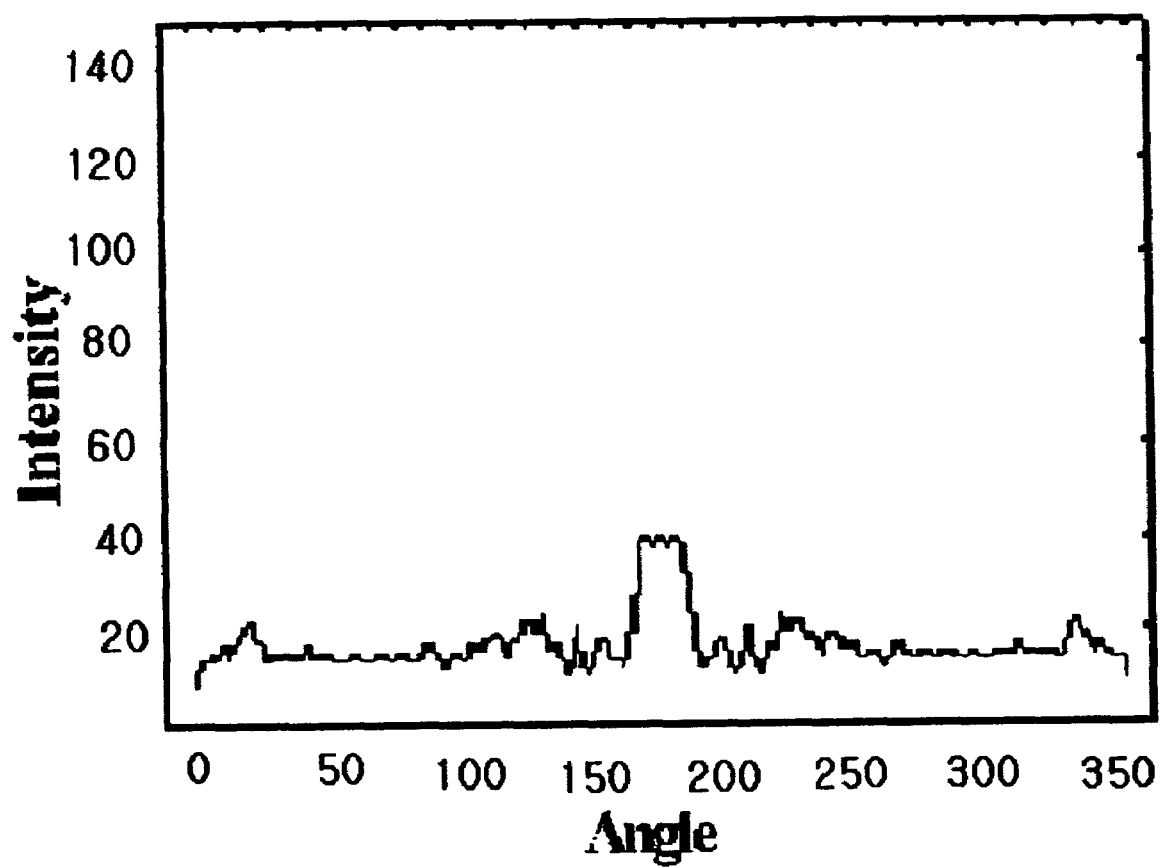
FIG. 8c shows the intensity of the plane beam depending on angles when the laser beam is an S-polarized beam and reflectances are (40, 50)%.
Figure 8D:
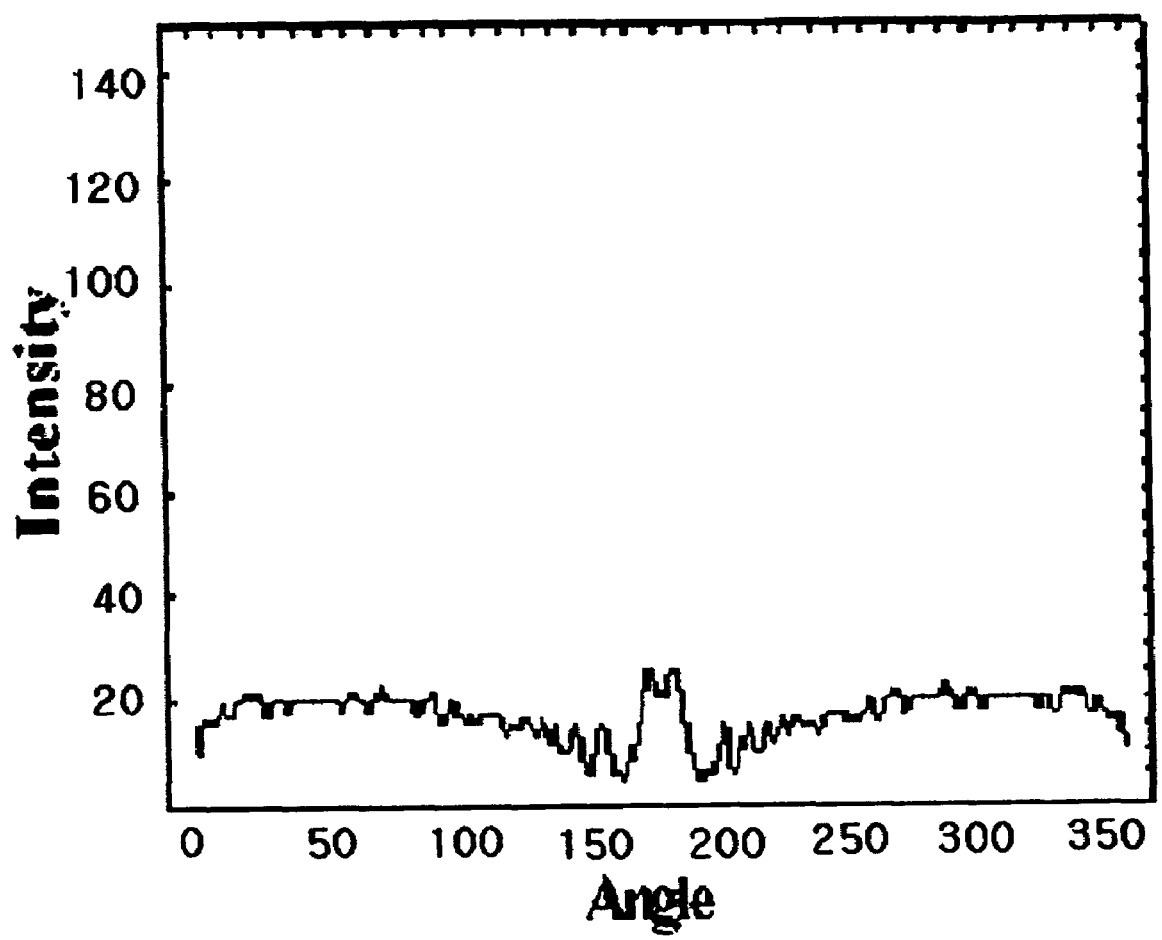
FIG. 8d shows the intensity of the plane beam depending on angles when the laser beam is an S-polarized beam and reflectances are (40, 60)%.
Figure 8E:
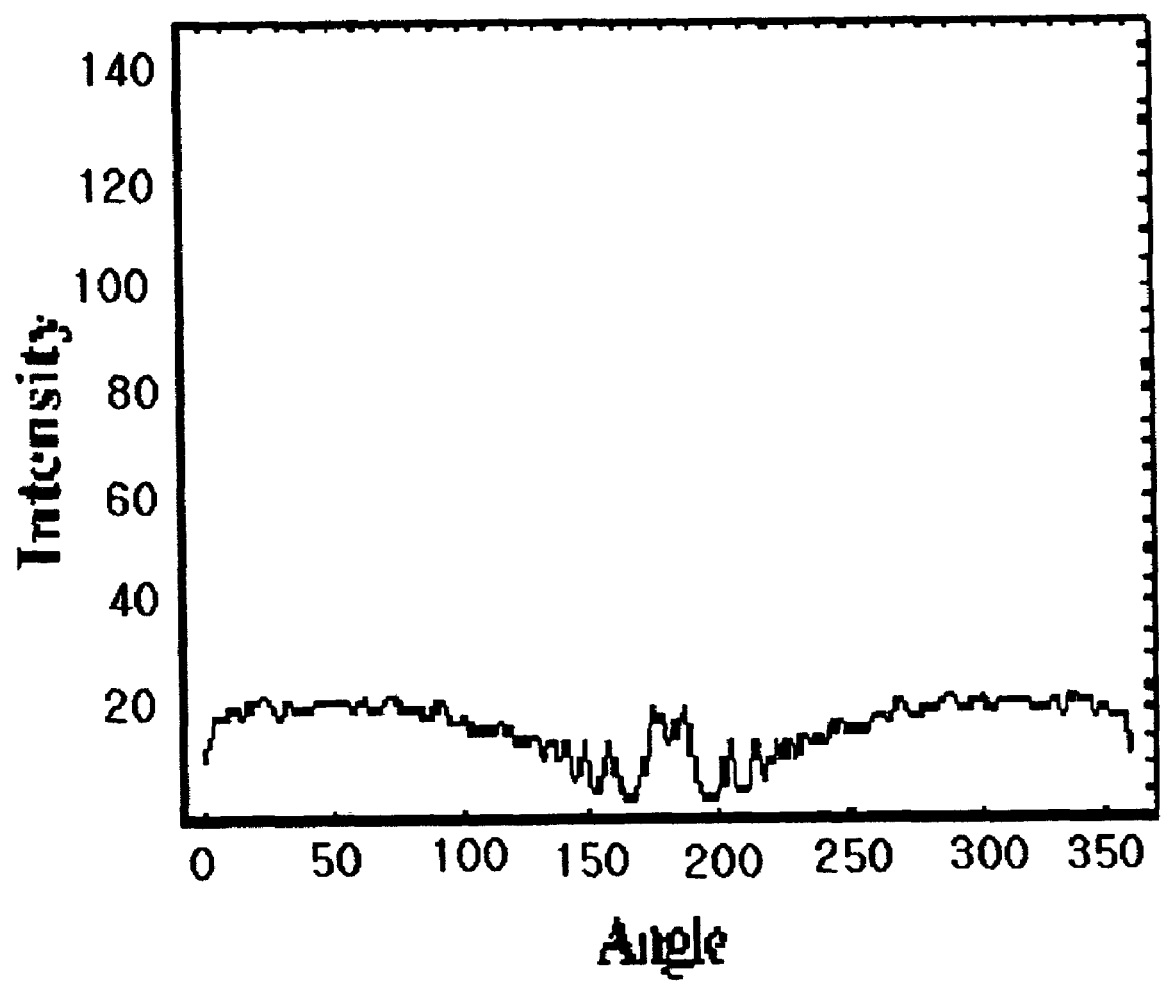
FIG. 8e shows the intensity of the plane beam depending on angles when the laser beam is an S-polarized beam and reflectances are (50, 70)%.

FIG. 8a shows the intensity of the plane beam depending on angles when the laser beam is an S-polarized beam and reflectances are (30, 40)%. FIG. 8b shows the intensity of the plane beam depending on angles when the laser beam is an S-polarized beam and reflectances are (30, 50)%. FIG. 8c shows the intensity of the plane beam depending on angles when the laser beam is an S-polarized beam and reflectances are (40, 50)%. FIG. 8d shows the intensity of the plane beam depending on angles when the laser beam is an S-polarized beam and reflectances are (40, 60)%. FIG. 8e shows the intensity of the plane beam depending on angles when the laser beam is an S-polarized beam and reflectances are (50, 70)%.

Figure 9A:
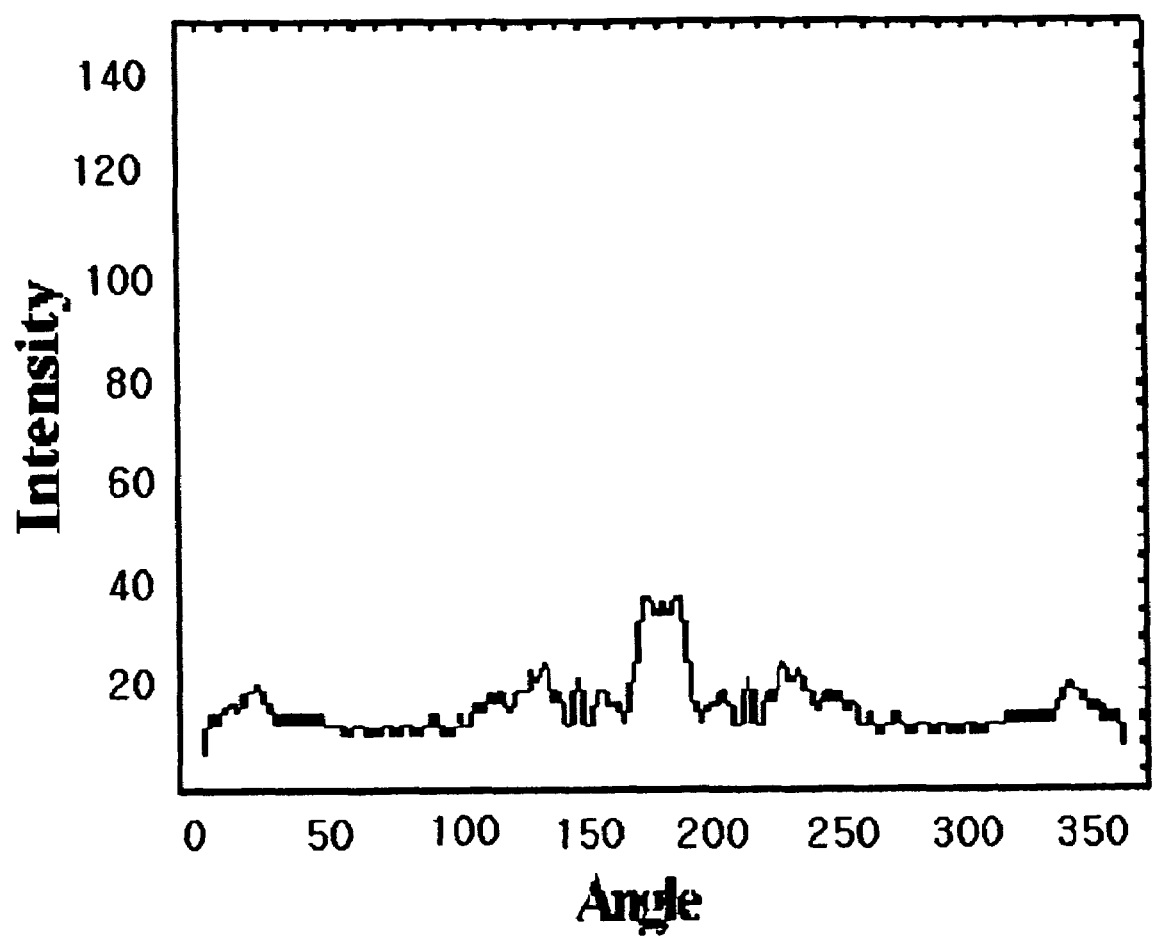
FIG. 9a shows the intensity of the plane beam depending on angles when the laser beam is a non-polarized beam and reflectances are (40, 40)%.
Figure 9B:
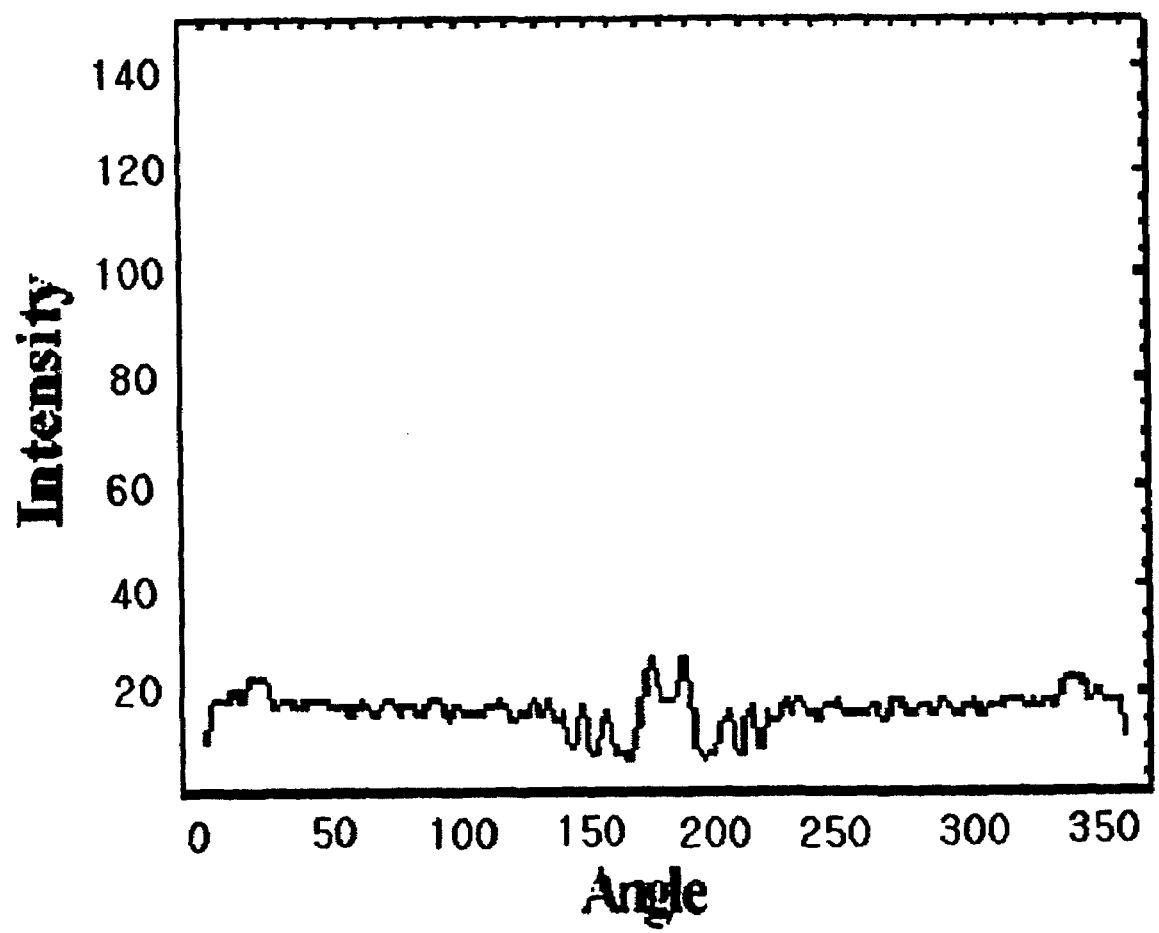
FIG. 9b shows the intensity of the plane beam depending on angles when the laser beam is a non-polarized beam and reflectances are (50, 50)%.

FIG. 9a shows the intensity of the plane beam depending on angles when the laser beam is a non-polarized beam and reflectances are (40, 40)%, and FIG. 9b shows the intensity of the plane beam depending on angles when the laser beam is a non-polarized beam and reflectances are (50, 50)%.

It can be known from the simulation results that R1 of 40% to 50% and R2 of 20% to 30% are preferable in the case of P-polarization, R1 of 30% to 50% and R2 of 40% to 70% are preferable in the case of S-polarization, and R1 and R2 of 40% to 50% are preferable in the case of non-polarization in order to obtain the uniform intensity of the plane beam propagated in all directions of 360° on an arbitrary plane of the cylindrical prism.

An apparatus for generating a conical beam will now be explained.

Figure 10A:
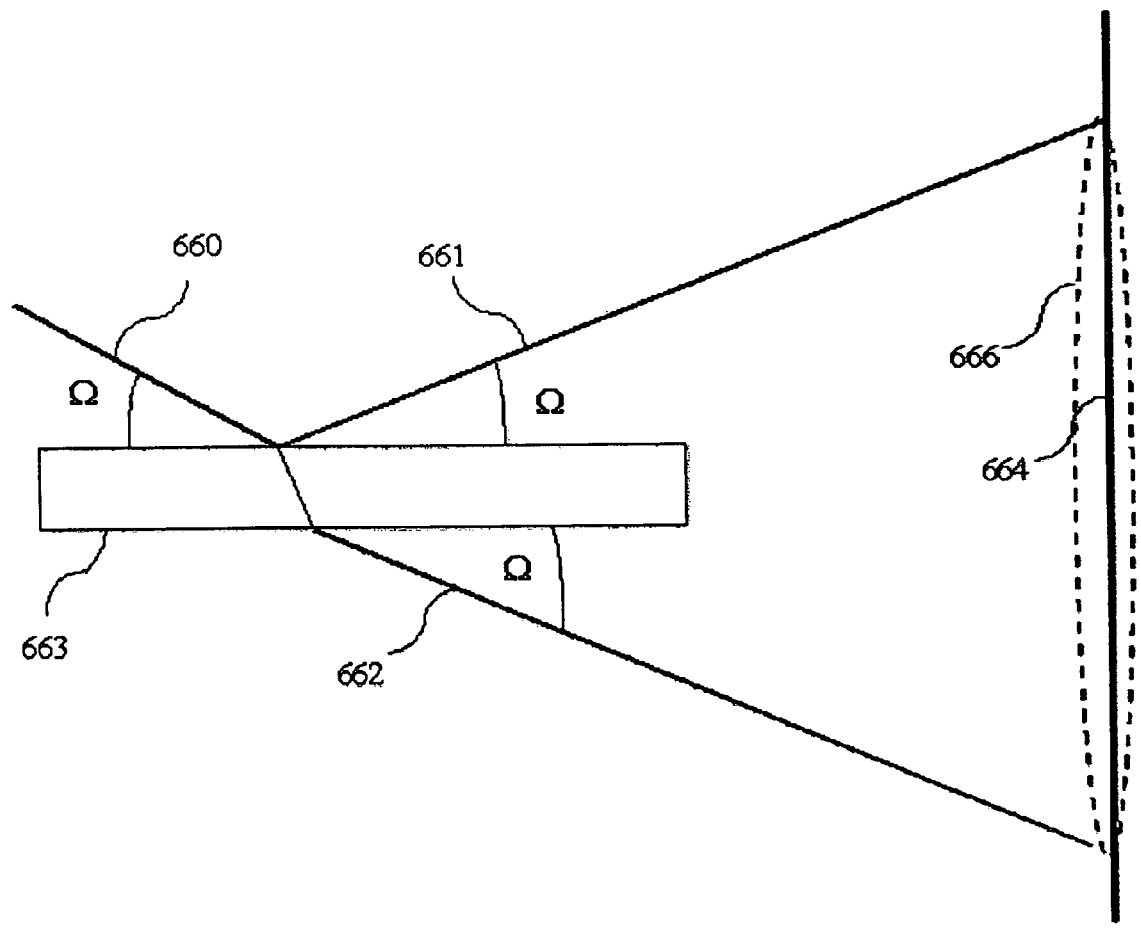
FIG. 10a shows a construction of a conical beam generating apparatus according to the present invention.

FIG. 10a shows a configuration of the conical beam generating apparatus according to the present invention. Referring to FIG. 10a, the conical beam generating apparatus includes a cylindrical prism 663, a laser beam generator (not shown) that generates a laser beam and emits the laser beam to the outer surface of the cylindrical prism 663, and a screen 664 on which a generated conical beam is scanned.

Figure 10B:
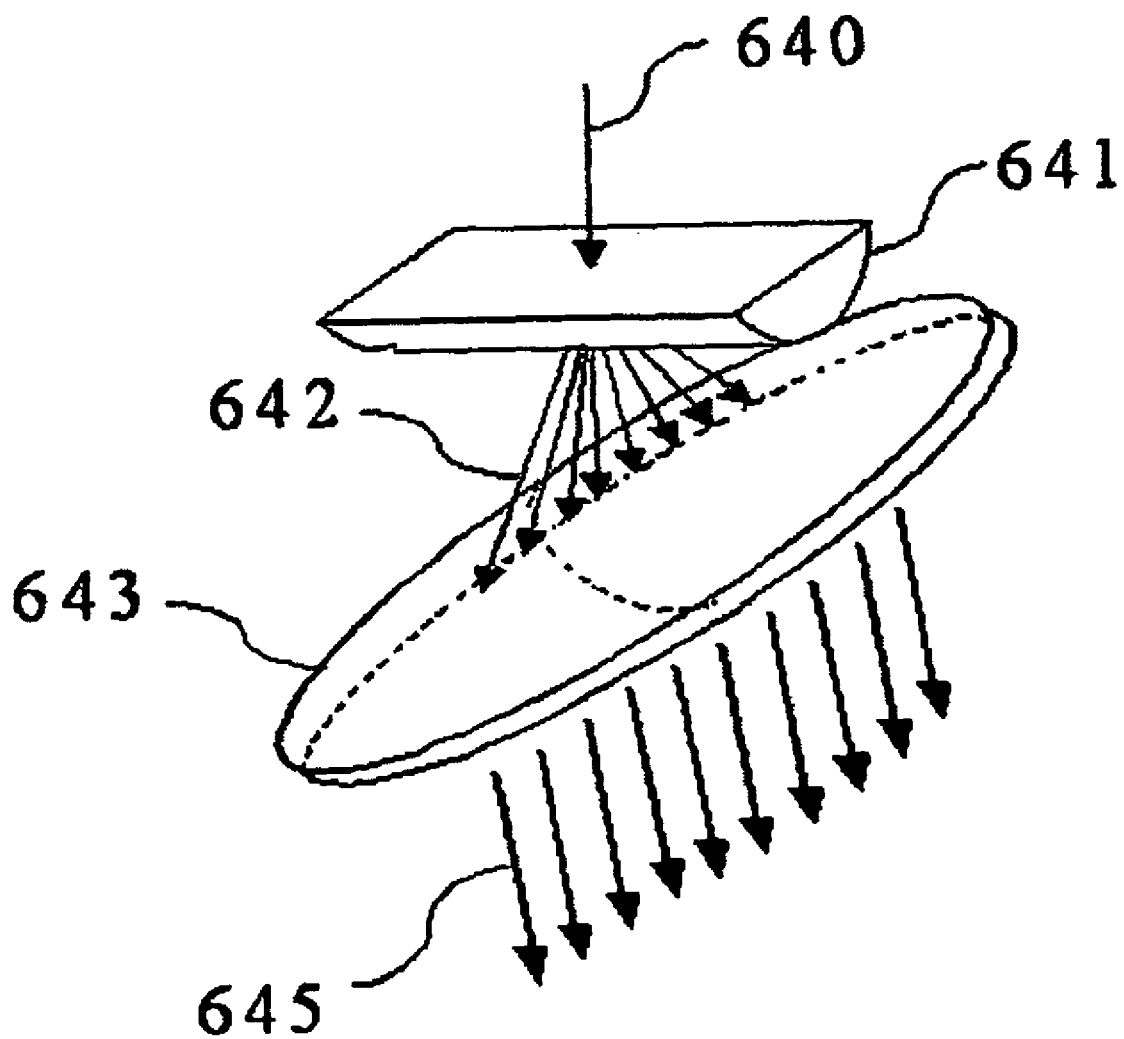
FIG. 10b shows a construction for generating parallel laser beams according to the present invention.

A light source (not shown) of the laser beam generator can be a device of generating a laser beam traveling straight, such as a laser diode and a helium-neon laser. The laser beam traveling straight is converted by a beam converter to a parallel laser beam having a width corresponding to the diameter of the cylindrical prism and it is incident on the cylindrical prism. An example of the beam converter for generating the parallel beam 645 is shown in FIG. 10a. As shown in FIG. 10b, a laser beam 640 passes through a half-cylindrical lens 641 to be converted to a beam 642 dispersed at a specific angle. The dispersed beam 642 passes through an optical element 643 that change a beam path, to be converted to the parallel laser beam 645 having a specific width. The beam converter is a preferred example and a construction for generating the parallel laser beam can be easily made in the art.

To manufacture the apparatus for projecting a laser beam, a device for fixing the cylindrical prism 663 and the laser beam generator (not shown) and the beam converter are required. However, the fixing device can be easily constructed by those skills in the art without having a technical difficulty so that explanation therefor is omitted.

The parallel laser beam generated by the laser beam generator (not shown) is incident on the outer surface of the cylindrical prism 663 as an incident laser beam 660 at a specific angle Ω. A part of the incident laser beam 660 is reflected from the surface of the cylindrical prism 663 at an angle identical to the incident angle Ω to become a reflective beam 661. The remaining part of the incident laser beam 660 passes through the cylindrical prism 663 to be a transmitted beam 662 propagated at the same angle as the incident angle Ω.

To make the intensity of a laser beam propagated in a conical form have a small deviation for all directions, a variety of variables must be controlled. These variables include a coating state of the outer surface of the cylindrical prism, a variation in curvature of the outer surface of the cylindrical prism, the material of the cylindrical prism and so on. The variables independently affect the deviation of the intensity of the conical laser beam and correlation of the variables also affect the deviation.

The screen 664 is placed in front of the cylindrical prism 663. The reflective beam 661 and the transmitted beam 662 are projected on the screen 664. The screen 664 can include a rotating device (not shown) that controls a setting angle of the screen such that the shape of the laser beam formed on the screen can be varied.

The laser beam generator (not shown) can include an incident angle controller (not shown) that controls an incident angle of the laser beam incident on the cylindrical prism 663 to change the size of a generated conical beam.

Figure 11:
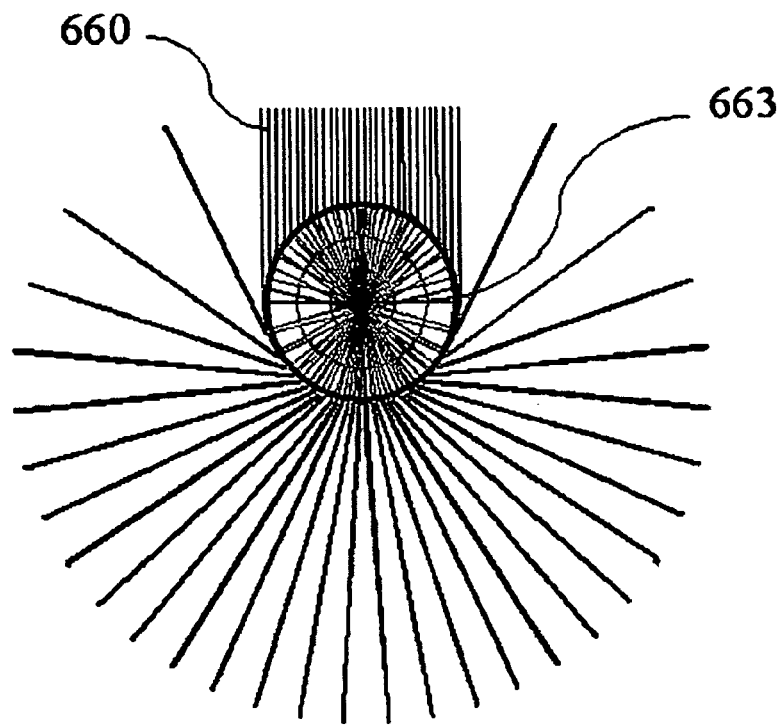
FIGS. 11(a) and (b) are a front view and a side view showing the result of a simulation of generating a conical beam from a transmitted beam generated by the conical beam generating apparatus of the present invention.
Figure 11:
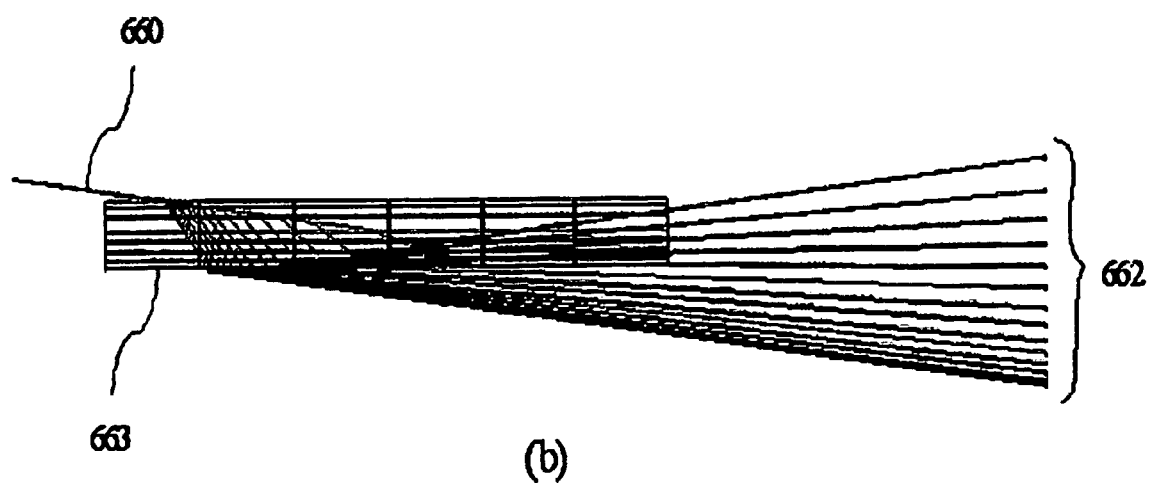

FIGS. 11(a) and (b) are a front view and a side view showing the result of a simulation of generating a conical beam from a transmitted beam generated by the conical beam generating apparatus of the present invention. Referring to FIGS. 11(a) and (b), the laser beam incident on the cylindrical prism 663 is refracted according to the refractive law. Specifically, when a wave is propagated from an isotropic medium to another isotropic medium and refracted, sin(i)/sin (r)=n (n is a constant) where i is an incident angle and r is a refraction angle when an incident plane (a plane including a normal of the propagation direction of an incident wave and a boundary face of the media) and a refractive plane (a plane including a normal of the propagation direction of a refracted wave and the boundary face) are located on the same plane. In this case, n is called a refractive index of a refractive medium with respect to an incident medium.

As shown in FIG. 11(a), the transmitted beam 662 projected on the screen has a circular plane shape.

Figure 12:
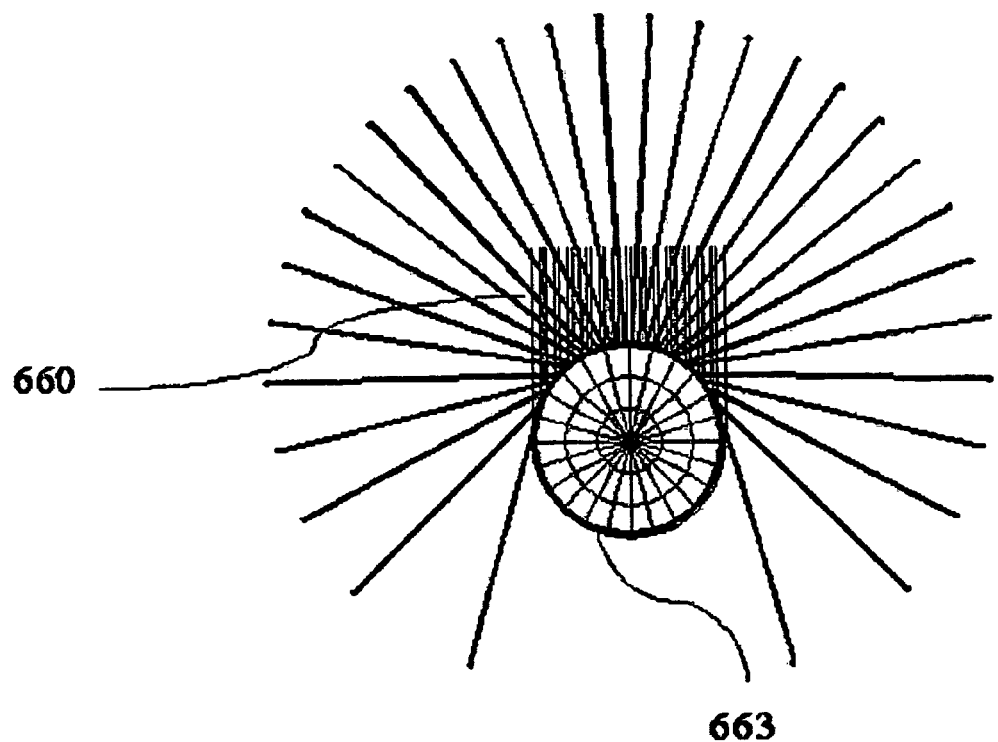
FIGS. 12(a) and (b) are a front view and a side view showing the result of a simulation of generating a conical beam from a reflected beam generated by the conical beam generating apparatus of the present invention.
Figure 12:
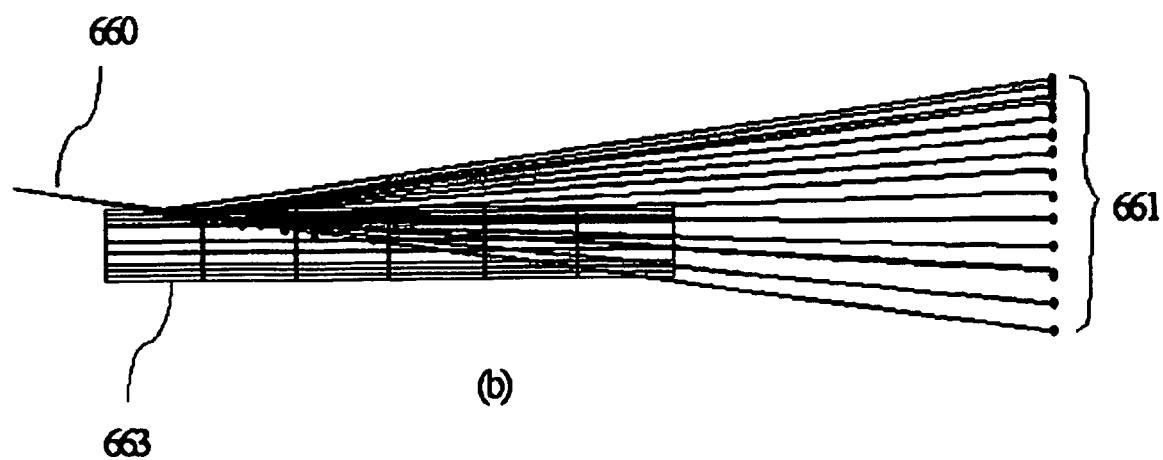

FIGS. 12(a) and (b) are a front view and a side view showing the result of a simulation of generating a conical beam from a reflected beam generated by the conical beam generating apparatus of the present invention. Referring to FIGS. 12(a) and (b), the incident laser beam 660 is reflected according to the reflective law. The reflective law defines the directions of an incident wave and a reflected wave. Specifically, the incident wave and the reflected wave are located on the same plane perpendicular to a reflective plane and opposite to each other having a normal perpendicular to the reflective plane between them, and a reflective angle and an incident angle are identical to each other.

As shown in FIG. 12(a), the reflected beam 661 projected on the screen has a circular plane shape.

Figure 13:
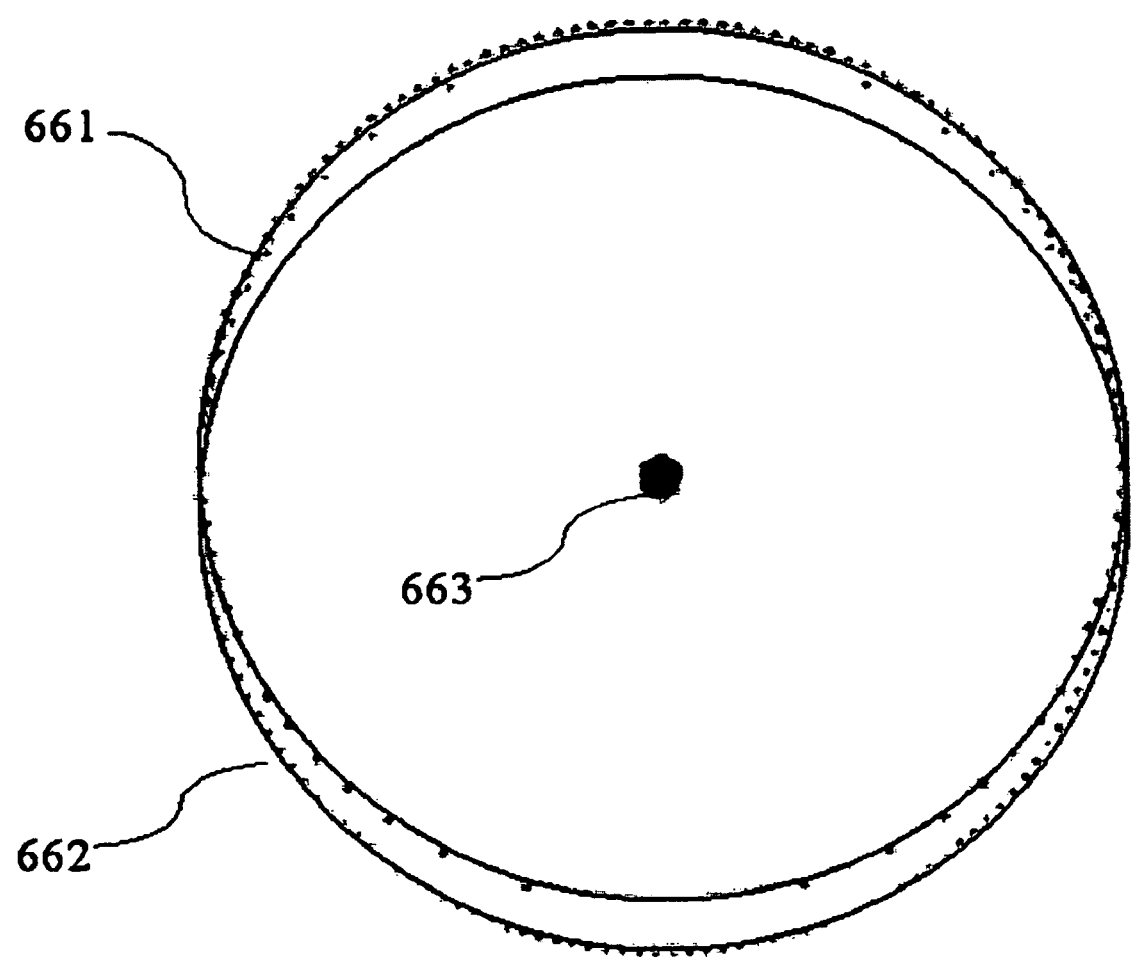
FIG. 13 is a front view of a mixed beam of a transmitted beam and a reflected beam generated by the conical beam generating apparatus according to the present invention.

FIG. 13 is a front view of a mixed beam of the transmitted beam 662 and the reflected beam 661 generated by the conical beam generating apparatus according to the present invention. Referring to FIG. 13, the transmitted beam 662 and the reflected beam 661 respectively form circles around the cylindrical prism 663. The reflected beam 661 has a high laser beam irradiation density at the top side of the corresponding circle while the transmitted beam 662 has a high laser beam irradiation density at the bottom side of the corresponding circle. The centers of the two circles do not completely correspond to each other. Here, the radiuses of the circles formed by the transmitted beam 662 and the reflected beam 661 are varied when the incident angle is changed. Accordingly, the radiuses of the circles can be changed by controlling the incident angle.

A security system using a plane beam generated by the aforementioned plane beam generating apparatus according to the present invention will now be explained.

Figure 14:
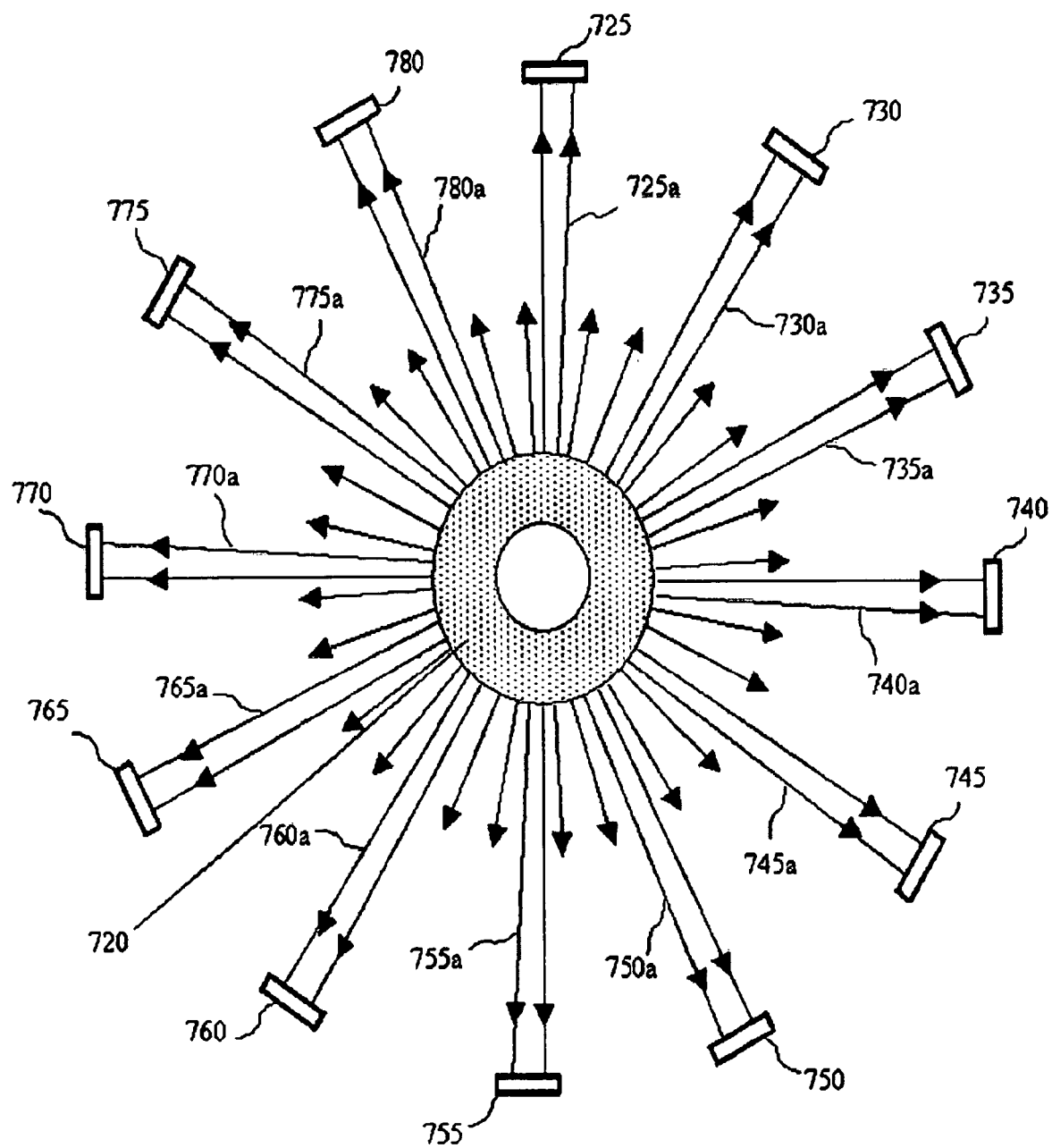
FIG. 14 shows a security system using a plane beam according to an embodiment of the present invention.

FIG. 14 shows a security system having light-receiving elements 725, 730, 735, 740, 745, 750, 755, 760, 765, 770, 775 and 780 that are arranged around a cylindrical prism that generates plane beams. As shown in FIG. 14, the plane beams are propagated from the cylindrical prism 720 in all directions of 360° and parts of the plane beams 725a, 730a, 735a, 740a, 745a, 750a, 755a, 760a, 765a, 770a, 775a and 780a are incident on the light-receiving elements. If a person intrudes into a space where the cylindrical prism and the light-receiving elements are installed, plane beams passing through the region where the intruder is located are blocked by the intruder so that the plane beams cannot reach corresponding light-receiving elements. This changes signals of the light-receiving elements. Accordingly, it is possible to sense the intrusion by detecting a change in the signals of the light-receiving elements.

While the light-receiving elements 725, 730, 735, 740, 745, 750, 755, 760, 765, 770, 775 and 780 are arranged having a predetermined distance from the cylindrical prism to detect an intruder, as shown in FIG. 14, the light-receiving elements can be located in close proximity to the outer surface of the cylindrical prism such that the light-receiving elements are effectively arranged and managed. At this time, an optical system is arranged such that the plane beams are reflected by a reflecting element. The reflecting element includes a mirror and a prism, which can reflect the plane beams to the cylindrical prism. The present invention uses a corner cube as the reflecting element because the corner cube can be easily installed. The corner cube generates a reflective beam that is reflected in parallel with an incident beam irrespective of the incident angle of the incident beam.

Figure 15:
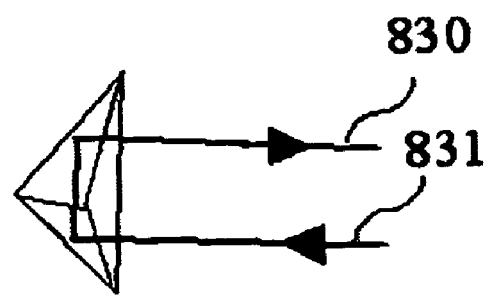
FIG. 15 shows reflective characteristic of a corner cube.
Figure 15:
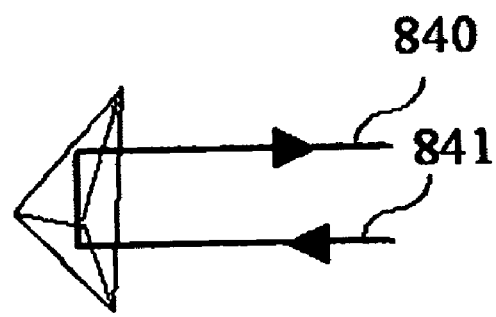
Figure 15:
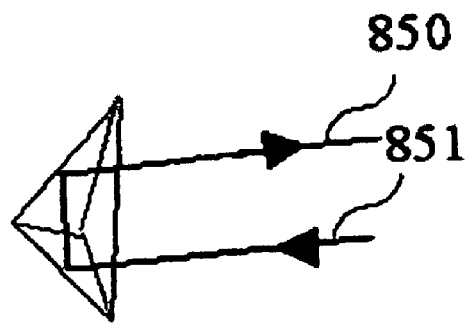

FIG. 15 shows a reflecting operation of the corner cube. FIGS. 15(A), (B) and (C) show movements of reflective beams 831, 841 and 851 with respect to incident beams 830, 840 and 850. Though the incident beams 830, 840 and 850 of FIG. 15(A) are not parallel with one another, the reflective beam 831 and the incident beam 830 of FIG. 15(A) are parallel with each other, the reflective beam 841 and the incident beam 840 of FIG. 15(B) are parallel with each other, and the reflective beam 851 and the incident beam 850 of FIG. 15(C) are also parallel with each other. That is, the corner cube generates a reflective beam that is reflected in parallel with an incident beam irrespective of the incident angle of the incident beam.

Figure 16A:
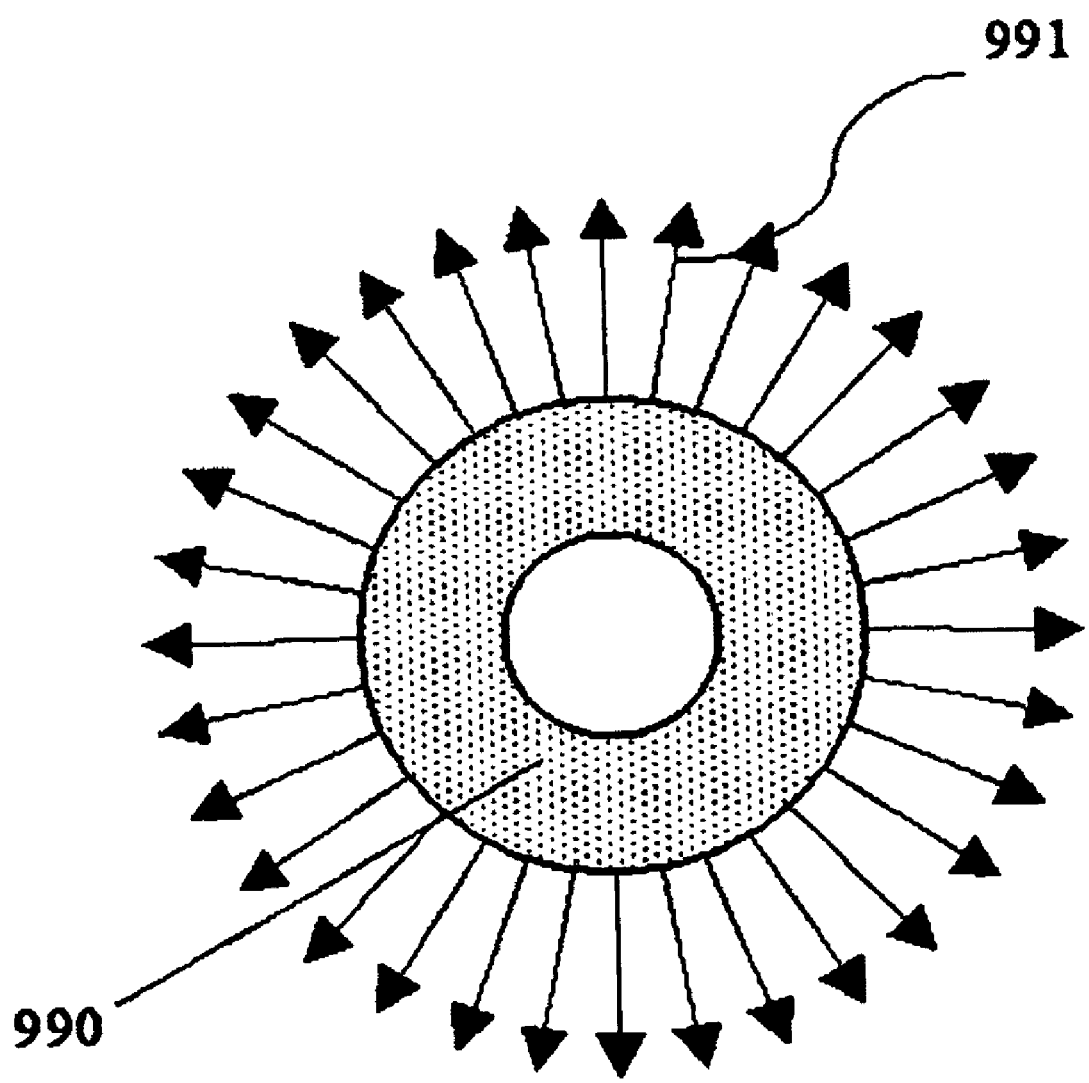
FIGS. 16a and 16b show a security system employing a corner cube and a plane beam according to an embodiment of the present invention.
Figure 16B:
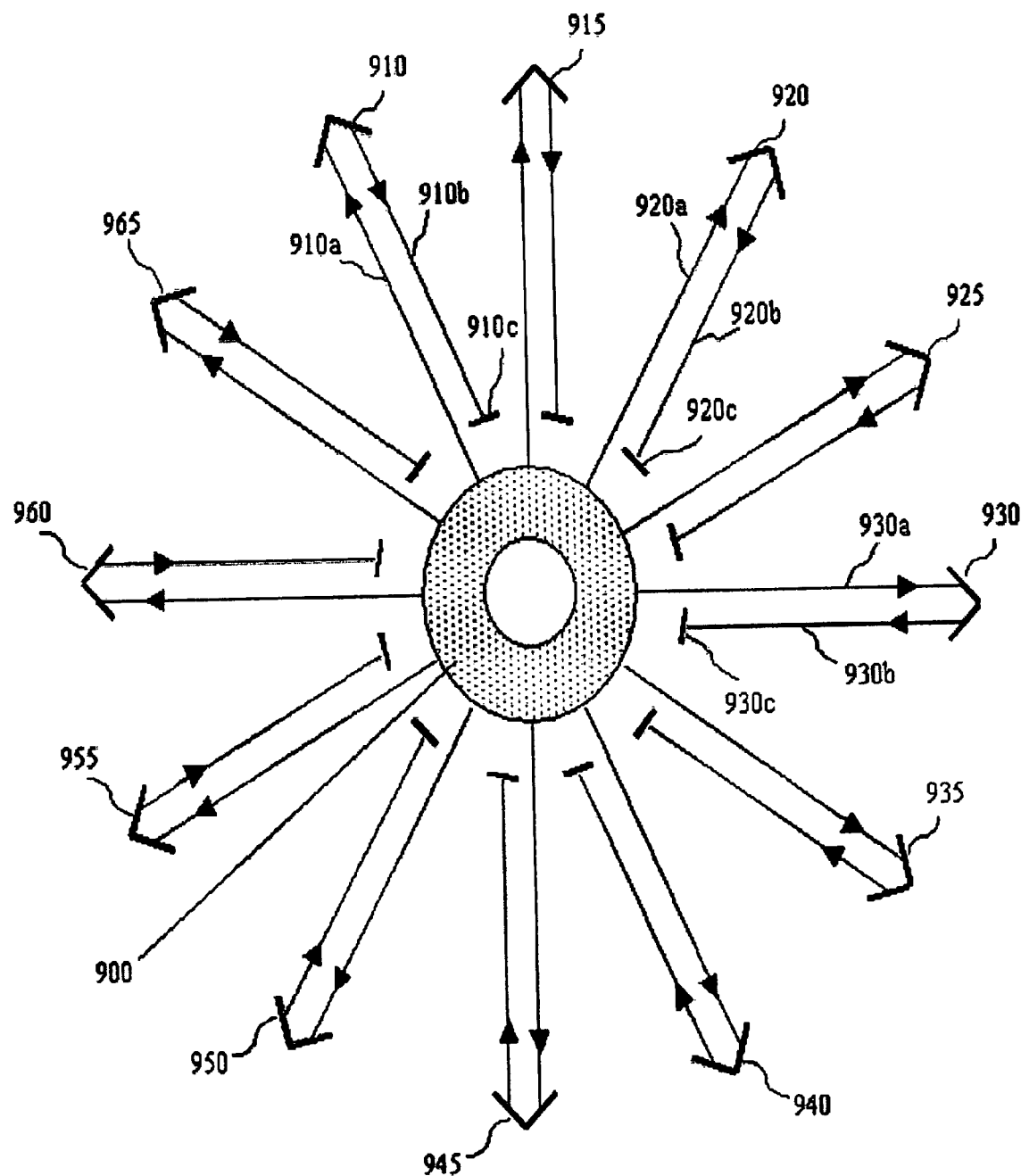

FIG. 16a shows the cross section of a plane on which plane beams are propagated from the cylindrical prism. FIG. 16b shows a security system constructed using the plane beams, the corner cube and the light-receiving elements according to an embodiment of the present invention. FIGS. 16a and 16b and the following drawings do not show the laser beam traveling straight (referring to 50 of FIG. 2) and the laser beam generator (referring to 40 of FIG. 4) for convenience.

FIG. 16a illustrates plane beams 991 propagated in all directions on the same plane as the plane on which the laser beam traveling straight (not shown) is incident on the cylindrical prism 990. FIG. 16b illustrates only the plane beams that are incident on corner cubes and reflected from the corner cubes to be propagated to the light-receiving elements.

The operation principle of the security system will now be explained in more detail with reference to FIG. 16b.

When a laser beam (not shown) is incident on the cylindrical prism, plane beams are generated and propagated in the air. Corner cubes are installed at predetermined positions through which the plane beams are propagated in order to reflect parts of the plane beams to the cylindrical prism. As described above, the corner cubes generate reflective beams parallel with incident beams. Thus, beams reflected from the corner cubes are propagated to the cylindrical prism to be incident on the light-receiving elements arranged around the cylindrical prism even when the corner cubes are not located at exactly correct positions. If an intruder in the space where the cylindrical prism and the corner cutes are installed is detected, incident beams incident on the corner cubes or reflective beams reflected from the corner cubes are blocked by the intruder so that the light-receiving elements cannot receive any beam. Thus, the security system can detect the intruder.

FIG. 16b shows twelve corner cubes 910, 915, 920, 925, 930, 935, 940, 945, 950, 955, 960 and 965 arranged around the cylindrical prism 900. Twelve light-receiving elements are installed corresponding to the twelve corner cubes. While only the twelve corner cubes and light-receiving elements are installed in this embodiment, several tens of corner cubes and light-receiving elements can be set if there is a space for them.

In this case, a target region can be thoroughly monitored.

The movement of a plane beam that is incident on each corner cube and reflected from the corner cube to be incident on a corresponding light-receiving element is identical for all of the corner cubes. Thus, only the movement of a beam incident on one corner cube 910 is explained.

A laser beam (not shown) is incident on the cylindrical prism to be converted to a plane beam. A part 910a of the plane beam is incident on the corner cube 910 and its propagation path is changed by the corner cube 910, to generate a reflective beam 910b. The input beam 910a and the reflective beam 910b are propagated in parallel with each other because of the characteristic of the corner cube. The reflective beam 910b is incident on the light-receiving element 910c arranged in proximity to the cylindrical prism 900. The input beam 910a and the reflective beam 910b are propagated in parallel with each other even when the corner cube 910 is not set at exactly correct position. Accordingly, the arrangement of components including the corner cubes and light-receiving elements of the security system is facilitated when the corner cubes are employed.

Figure 17A:
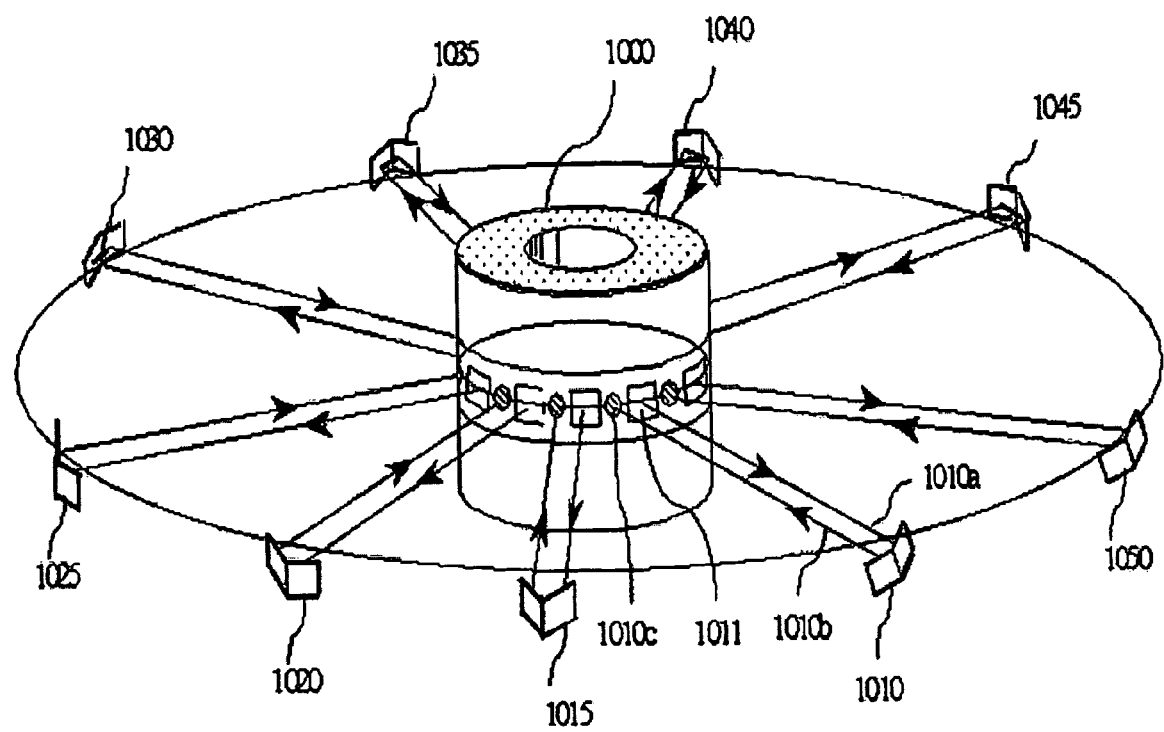
FIGS. 17a and 17b show a security system employing a corner cube, a plane beam and a light-receiving mounting member according to an embodiment of the present invention.
Figure 17B:
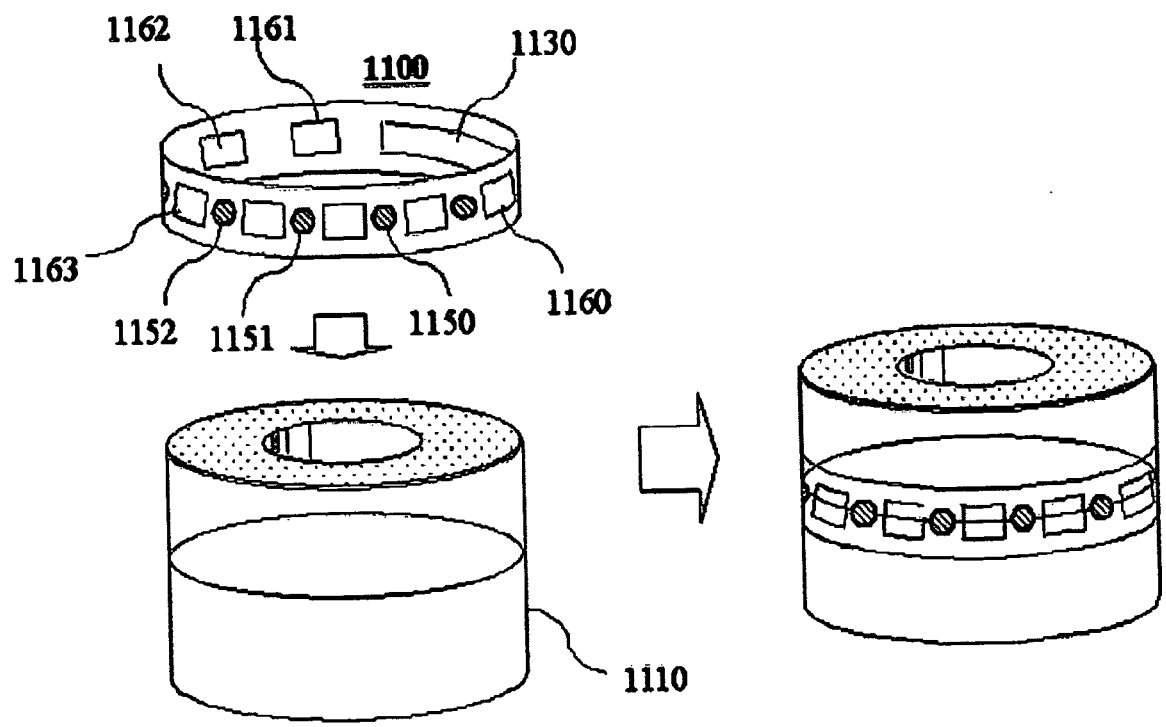

FIGS. 17a and 17b show a security system using a plane beam according to another embodiment of the present invention.

Referring to FIGS. 17a and 17b, a plurality of corner cubes 1010, 1015, 1020, 1025, 1030, 1035, 1040, 1045 and 1050 are arranged around a cylindrical prism 1000, which is similar to the construction shown in FIGS. 16a and 16b. The operations of the corner cubes are identical to those of the corner cubes of FIGS. 16a and 16b. A light-receiving element 1010c is set on a band type light-receiving element mounting member 1100. The light-receiving element mounting member 1100 surrounds the outer surface of the cylindrical prism 1000 and has openings 1160, 1161, 1162 and 1163 through which a part of plane beams can be propagated to the air. Each of light-receiving elements 1150, 1151 and 1152 is placed between adjacent openings. The light-receiving element mounting member 1100 further has a laser beam entrance 1130 through which a laser beam is incident on the cylindrical prism 1000. A portion of the mounting member 1100, which is in contact with the cylindrical prism (a portion other than the holes), is formed in black such that most of plane beams generated from the cylindrical prism can be absorbed. Otherwise, the portion can be coated such that most of the plane beams can be reflected therefrom.

The intensity of plane beams propagated to the air through the openings is stronger when the portion is coated than when the portion is in black. This is because that reflective beams are repeatedly reflected in the cylindrical prism to be propagated to the openings. Accordingly, the intensity of plane beams propagated to the air through the openings can be changed by varying the reflectance of the portion of the light-receiving mounting member that comes into contact with the cylindrical prism.

While it is preferable that the mounting member 1100 is made of a material that is flexible and easily attached to the cylindrical prism, such as resin and rubber, the mounting member 1100 is not largely affected by its material if the laser beam entrance 1130 and the openings can be formed and the mounting member having the light-receiving elements set thereon can be attached to the outer surface of the cylindrical prism.

Referring to FIG. 17a, the plurality of openings 1011 through which plane beams are propagated to the air are formed in the light-receiving element mounting member and the light-receiving element 1010c is located between adjacent openings. The light-receiving element 1010c is connected to an external component (not shown) via a wire (not shown). Furthermore, the plurality of corner cubes 1010, 1015, 1020, 1025, 1030, 1035, 1040, 1045 and 1050 are arranged around the cylindrical prism 1000. A part of a plane beam propagated to the air through the opening 1011 is incident on the corner cube 1010 to generate a reflective beam 1010b traveling in parallel with the input beam 1010a. The reflective beam 1010b is incident on the light-receiving element 1010c. If there is an intruder between the cylindrical prism 1000 and the corner prism 1010, the light-receiving element 1010c does not receive any beam and a variation in a signal of the light-receiving element is detected. Thus, it can be easily confirmed whether there is an intruder or not.

Figure 18:
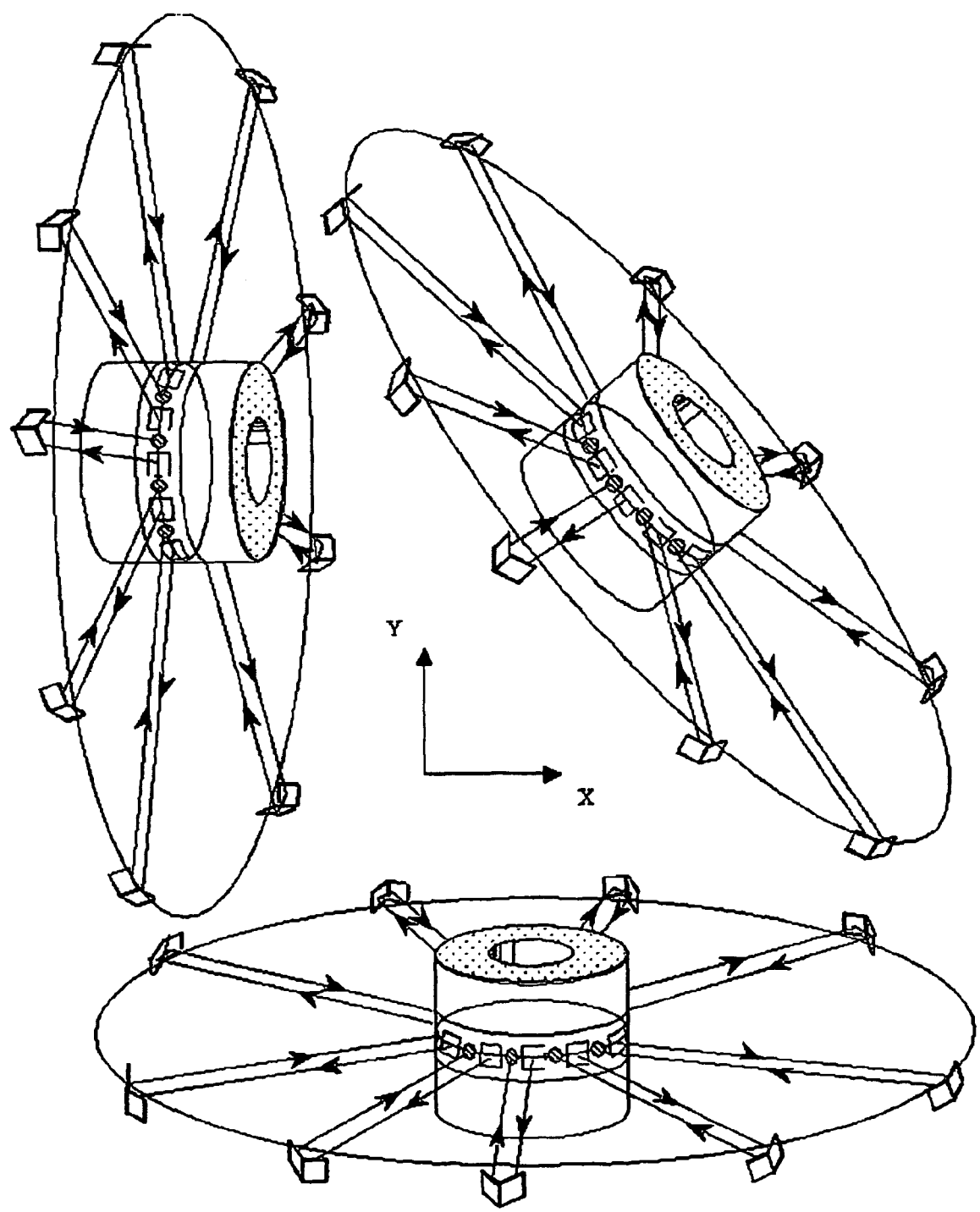
FIG. 18 shows a security system construction capable of monitoring a plurality of planes.

FIG. 18 shows a plurality of security systems that are respectively arranged on various planes. Specifically, the security systems are respectively located on an X-axis plane, a Y-axis plane and a plane tilted at a predetermined angle to the X- and Y-axis planes. As shown in FIG. 18, the security system including the cylindrical prism, the corner cubes and the light-receiving elements according to the present invention can be arranged on any plane.

Figure 19:
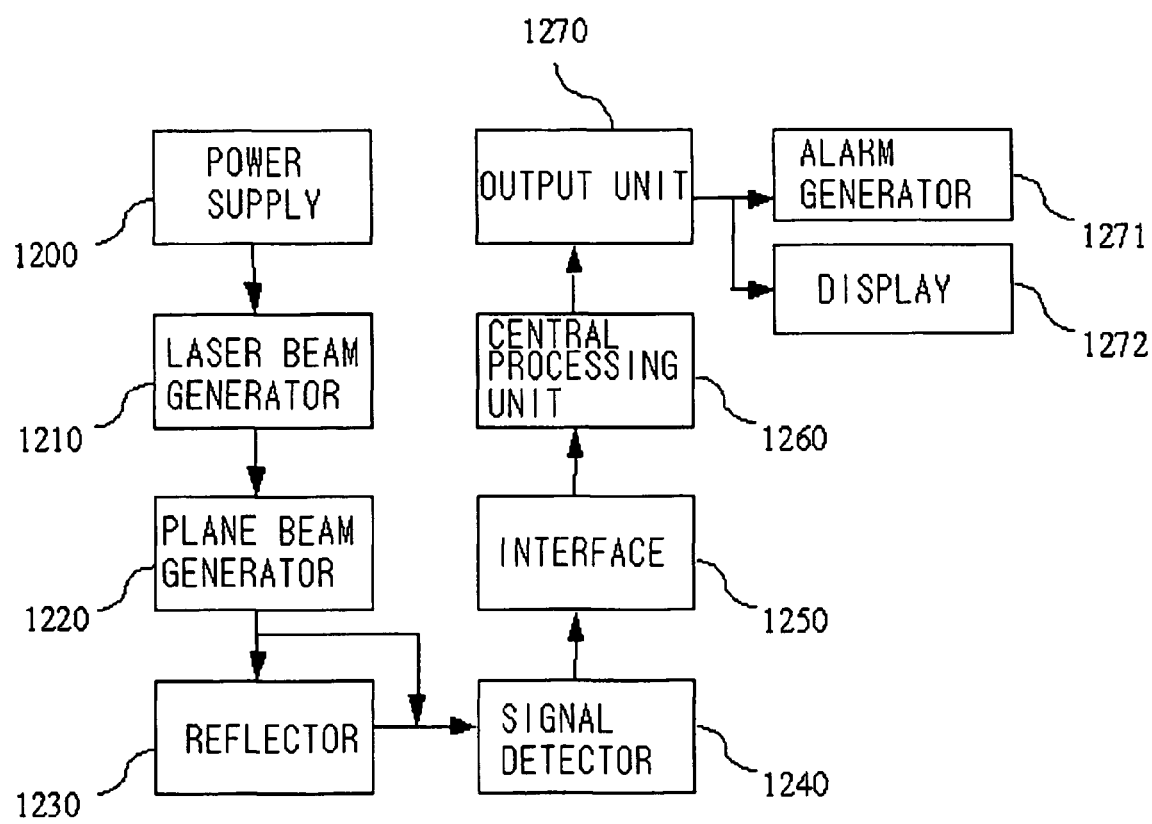
FIG. 19 is a block diagram of the security system.

FIG. 19 is a block diagram of the security system according to the present invention. The security system includes a laser beam generator 1210, a plane beam generator 1220, a signal detector 1240, a central processing unit 1260, and an output unit 1270. The laser beam generator 1210 includes a power supply 1200. A laser beam generated by the laser beam generator 1210 is converted to a plane beam through the plane beam generator 1220. The security system further includes a reflector 1230 for reflecting the plane beam generated by the plane beam generator 1220. While a corner cube can be used for the reflector because it can be easily installed, any optical element capable of reflecting the plane beam can be also used for the reflector.

A reflective beam that has been reflected by the reflector is incident on the signal detector 1240. The present invention uses the light-receiving element as the signal detector. A signal generated by the signal detector is transmitted to a central processing unit 1260 through an interface 1250. The central processing unit 1260 is programmed such that it can confirm the position of an intruder using signals transmitted from multiple light-receiving elements. The confirmed result is delivered to a manager through the output unit 1270. The output unit 1270 can include an alarm generator 1271 and a display 1272.

Figure 20:
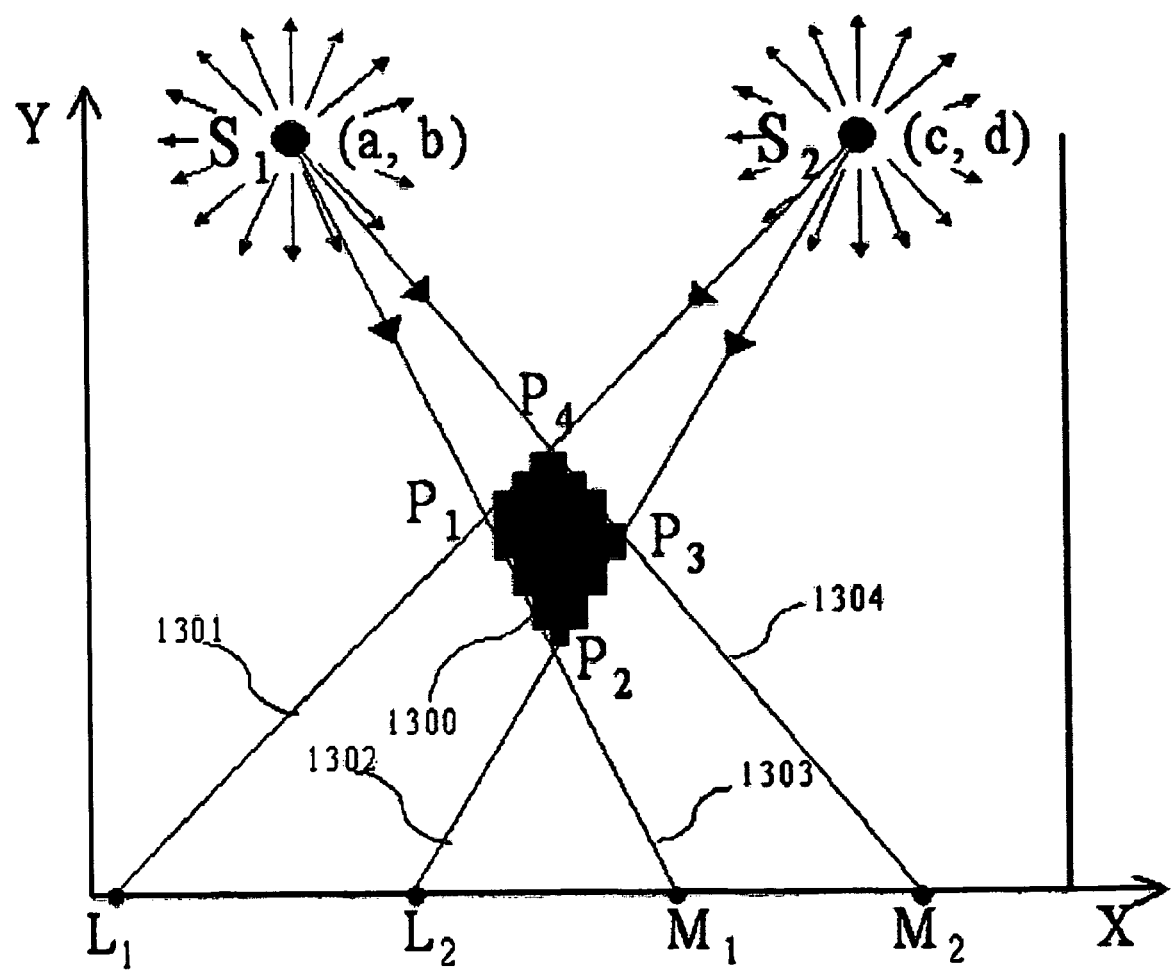
FIGS. 20 and 21 show a method of obtaining information about an intruder using a plurality of plane beams.

FIG. 20 shows a method of sensing the size and moving speed of an intruder in the security system. Referring to FIG. 20, when light sources for generating plane beams are S1 and S2, parts of the plane beams generated from the light sources S1 and S2 are blocked by an intruder 1300 so that the beams do not reach arbitrary positions on the X-axis. This generates boundary points of beams on the X-axis. When it is assumed that the boundary points are L1, L2, M1 and M2 and the coordinates of S1 and S2 are respectively (a, b) and (c, d), equations of boundary lines 1301, 1302, 1303 and 1304 of beams, generated due to rectilinearity of beams, are as follows.

$$\langle PSTYLELSPACE = 130\rangle \ y - d = \frac{d}{c - L_1}(x - c) \quad \text{[Equation 1]}$$

$$\langle PSTYLELSPACE = 130\rangle \ y - d = \frac{d}{c - L_2}(x - c) \quad \text{[Equation 2]}$$

-continued $$\langle PSTYLELSPACE=130\rangle \ y-b = \frac{b}{a-M_1}(x-a) \quad \text{[Equation 3]}$$

$$\langle PSTYLELSPACE=130\rangle \ y-b = \frac{b}{a-M_2}(x-a) \quad \text{[Equation 4]}$$

Due to the intruder 1300, intersecting points P1, P2, P3 and P4 are generated on the boundary lines. The coordinates of the intersecting points can be obtained from the aforementioned four equations. To detect the positions of the boundary points L1, L2, M1 and M2, light-receiving elements are arranged on the X-axis. An array sensor can be used as the light-receiving elements. Otherwise, individual sensors can be used as the light-receiving elements. The arrangement of the light-receiving elements is well known in the art so that detailed explanation therefor is omitted.

The intersecting points P1, P2, P3 and P4 include information about the size and motion of the intruder. Thus, the size, moving speed and moving direction of the intruder can be easily confirmed through the intersecting points. This enables real-time intrusion detection.

Figure 21:
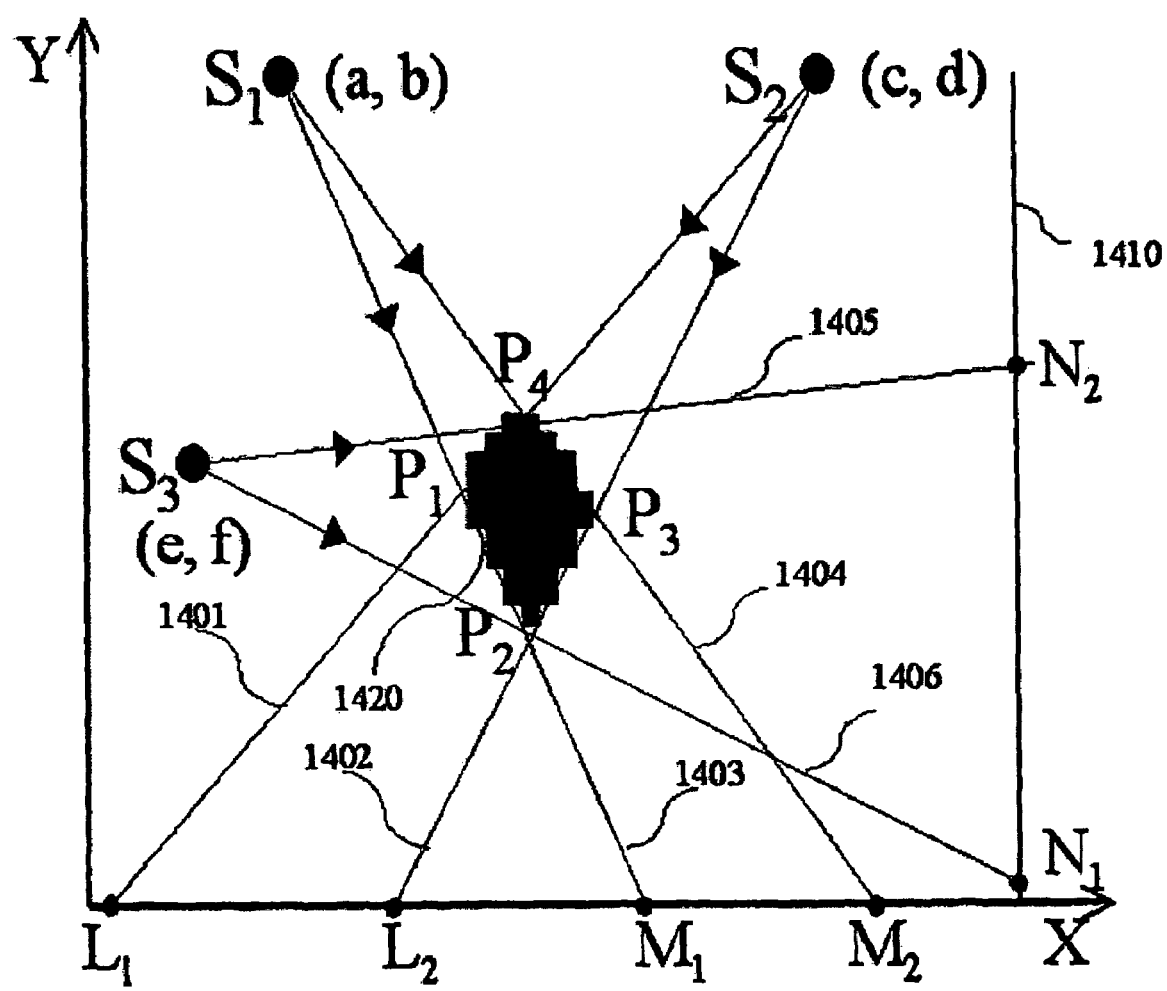

FIG. 21 shows an arrangement plan for increasing the number of boundary points and intersecting points by increasing the number of light sources so as to measure the size, moving speed and moving direction of an intruder more accurately. When three plane beams are used, as shown in FIG. 21, boundary points N1 and N2 on a line 1410 on which light-receiving elements are arranged can be obtained in addition to the boundary points L1, L2, M1 and M2. From the boundary points L1, L2, M1, M2, N1 and N2 and boundary lines 1405 and 1406, the size, moving speed and moving direction of the intruder can be measured more accurately.

A security system using a conical beam generated by a conical beam generating apparatus according to the present invention will now be explained.

The conical beam generating apparatus of the present invention includes a cylindrical prism having a predetermined diameter, and a laser beam generator that emits a laser beam to the outer surface of the cylindrical prism. It is preferable that the width of the laser beam emitted from the laser beam generator is identical to the diameter of the cylindrical prism. When the beam having the width identical to the diameter of the cylindrical prism is incident on the cylindrical prism at a predetermined angle to the outer surface of the cylindrical prism, a part of the input laser beam is reflected from the outer surface of the prism to be propagated in a conical form. A part of the laser beam, which is transmitted through the outer surface of the prism, passes through the cylindrical prism to be propagated in a conical form to the air.

Here, the laser beam generator includes an incident angle controller that controls an incident angle of the laser beam incident on the cylindrical prism.

The conical beam generating apparatus of the present invention further includes a screen that is located in front of the cylindrical prism. The conical beam is projected on the screen. Preferably, the screen includes a rotating device that controls a setting angle of the screen such that a shape of the conical beam projected on the screen is varied.

The security system employing the conical beam generating apparatus according to the present invention includes a conical beam generator, a signal detector, a central processing unit, and an output unit. The conical beam generator includes a cylindrical prism having a predetermined diameter and a laser beam generator that emits a laser beam to the outer surface of the cylindrical prism. The laser beam generator is arranged at a predetermined angle to the central axis of the cylindrical prism such that the laser beam emitted from the laser beam generator is incident on the cylindrical prism at a specific angle to the outer surface of the cylindrical prism. A part of the laser beam is reflected from the outer surface of the cylindrical prism to be propagated in a conical form. A part of the laser beam passes through the cylindrical prism to be propagated in a conical form to the air. The signal detector detects whether the conical beams are abnormal or not. The central processing unit judges whether there is an intruder on the basis of a signal detected by the signal detector. The output unit outputs the judgment result of the central processing unit. The security system can include a beam path converter, located between the conical beams generated from the laser beam generator and the signal detector. By doing so, the security system can detect an intrusion over an extended area and the signal detector can be arranged in various manners in the extended area.

A security system according to another embodiment of the present invention includes the conical beam generator, the beam path converter that reflects a conical beam generated by the conical beam generator, a signal detector having a plurality of light-receiving elements to detect the beam reflected by the beam path converter, a central processing unit that judges whether there is an intruder according to a signal detected by the signal detector, and an output unit that outputs the judgment result of the central processing unit.

Here, the signal detector can be attached to the cylindrical prism or installed in an arbitrary space. The beam path converter is located at a predetermined position such that it changes the path of the conical beam to input the conical beam to the signal detector. A variety of optical elements including a mirror, a half mirror and a corner cube can be used as the beam path converter. Preferably, the corner cube is used to obtain a reflective beam propagated in parallel with an incident beam.

A plurality of security systems can be respectively arranged at different positions to detect an intrusion in a plurality of three-dimensional spaces.

The output unit can include an alarm generator and a display.

The security system employing the conical beam generating apparatus according to the present invention will now be explained in more detail with reference to FIG. 22.

Figure 22:
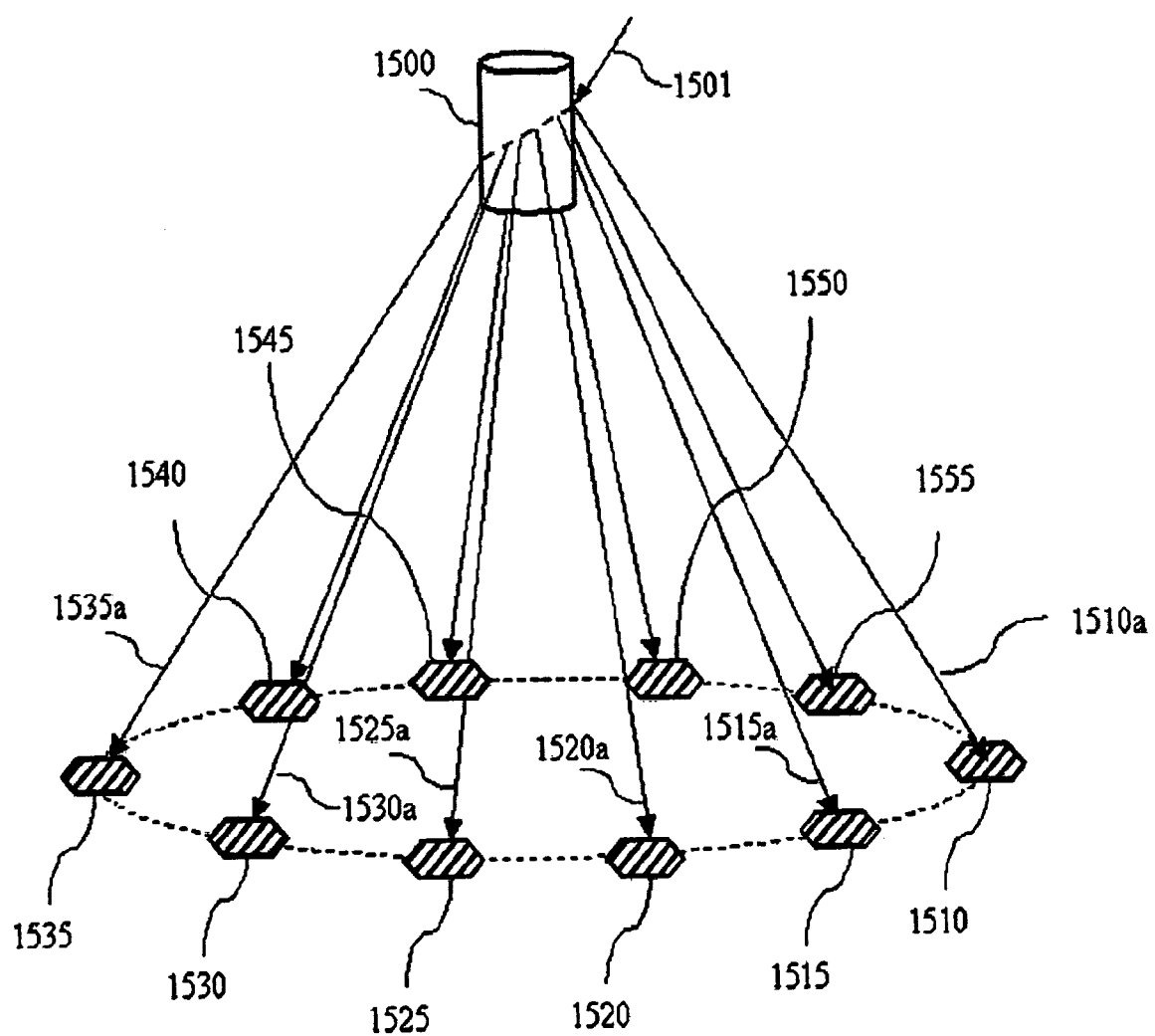
FIG. 22 shows a security system using a conical beam according to an embodiment of the present invention.

Referring to FIG. 22, the security system includes a cylindrical prism 1500 located at the upper part and signal detectors 1510, 1515, 1520, 1525, 1530, 1535, 1540, 1545, 1550 and 1555. A laser beam 1501 is incident on the cylindrical prism 1500 to be converted to a conical beam 1510a, 1515a, 1520a, 1525a, 1530a and 1535a. The signal detectors detect the conical beam. Only parts of the conical beam and signal detectors are shown in FIG. 22 for convenience.

The conical beam generated by the cylindrical prism is propagated to the signal detectors. If there is an intruder between the cylindrical prism and the signal detectors, the intruder blocks a part of conical beam so that a corresponding signal detector cannot detect a signal. In this manner, the security system detects an intrusion. Optical sensors are generally used as the signal detectors. While only ten optical sensors are shown in FIG. 22, several tens of optical sensors can be used if required.

Furthermore, the security system includes a central processing unit (not shown) that receives a signal detected by the signal detectors to judge whether there is an intrusion, and an output unit (not shown) that outputs the judgment result of the central processing unit. The central processing unit is programmed such that it can confirm an intrusion in a monitored area, and the confirmed result is transmitted to a manager through the output unit. The output unit can include an alarm generator for generating an alarm sound when the central processing unit judges that there is an intrusion to inform the manager of the intrusion, and a display for displaying the fact of the intrusion.

Figure 23:
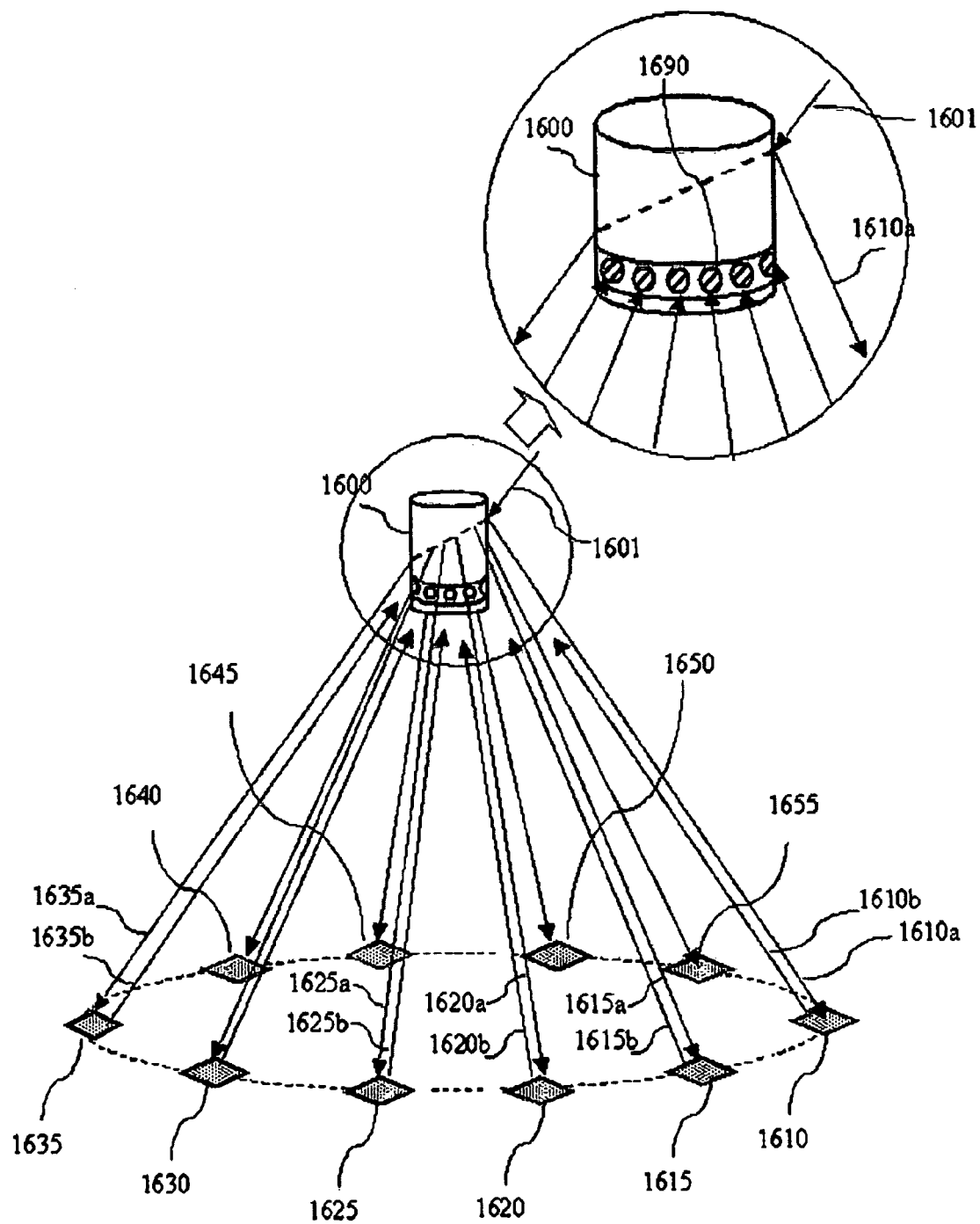
FIG. 23 shows a security system using a conical beam according to another embodiment of the present invention.

FIG. 23 shows a security system according to another embodiment of the present invention. The security system includes a cylindrical prism 1600, beam path converters 1610, 1615, 1620, 1625, 1630, 1635, 1640, 1645, 1650 and 1655, and a signal detector. The signal detector of the security system is arranged around the cylindrical prism 1600. As shown in FIG. 23, a laser beam 1601 is incident on the cylindrical prism 1600 and reflected from the cylindrical prism 1600 or transmitted through the cylindrical prism, to be converted to a conical beam 1610a, 1615a, 1620a, 1625a, 1630a and 1635a. The conical beam is reflected by the beam path converters, and reflected parts 1610b, 1615b, 1620b, 1625b, 1630b and 1635b of the conical beam are propagated to the signal detectors. If there is an intruder between the beam path converters and the signal detector, the reflected beam is not detected by the signal detector. Thus, the intrusion can be confirmed.

Figure 24:
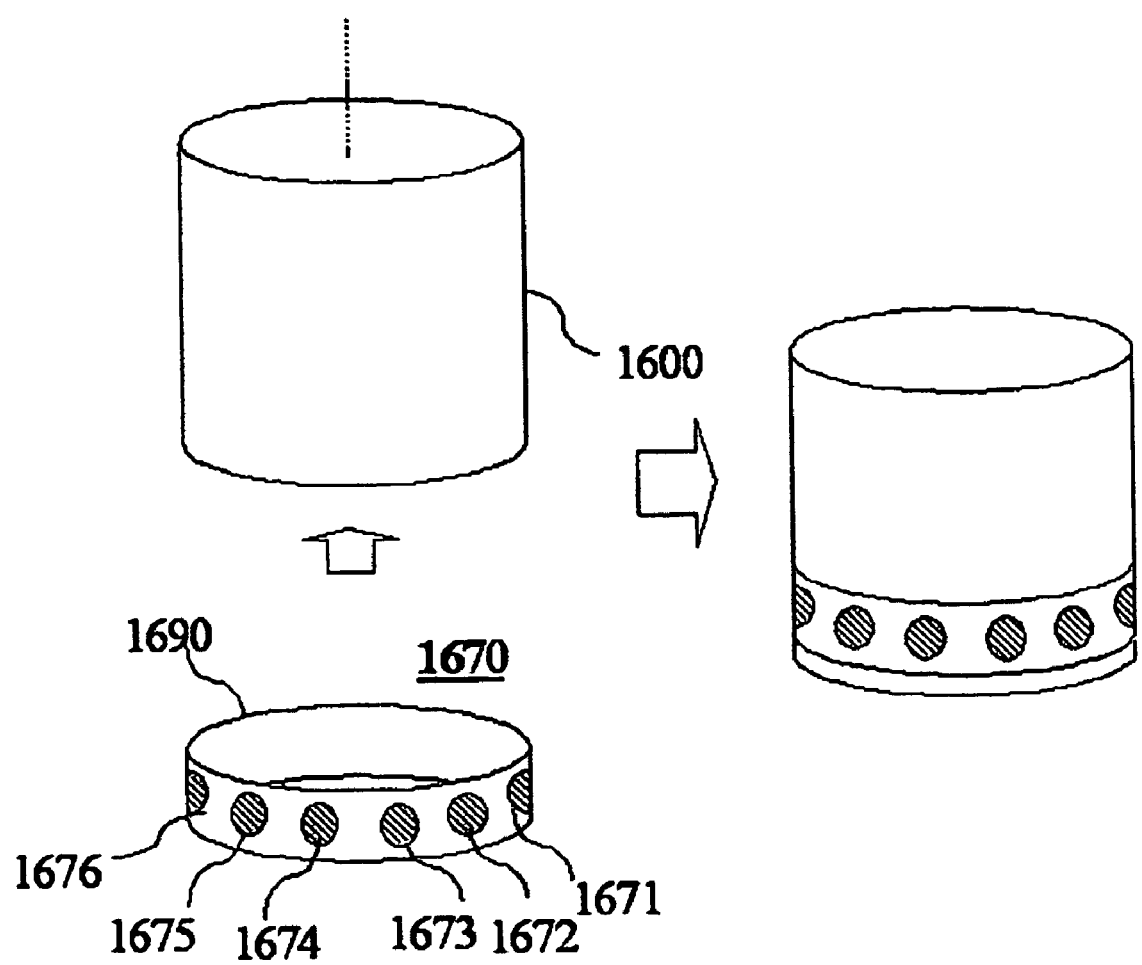
FIG. 24 shows an optical sensor mounting member attached to a cylindrical prism.

FIG. 24 shows the arrangement of the cylindrical prism 1600 and the signal detector 1670. The signal detector 1670 is constructed in such a manner that optical sensors 1671, 1672, 1673, 1674, 1675 and 1676 are set on an optical sensor mounting member 1690 having a flexible band shape. Thus, the signal detector can be easily attached to the cylindrical prism. The optical sensors are arranged such that they respectively receive the reflected parts 1610b, 1615b, 1620b, 1625b, 1630b and 1635b of the conical beam, shown in FIG. 23. While the optical sensors require wires for being provided with power and transmitting detected signals, the wires are not shown in FIG. 14 for convenience.

Figure 25:
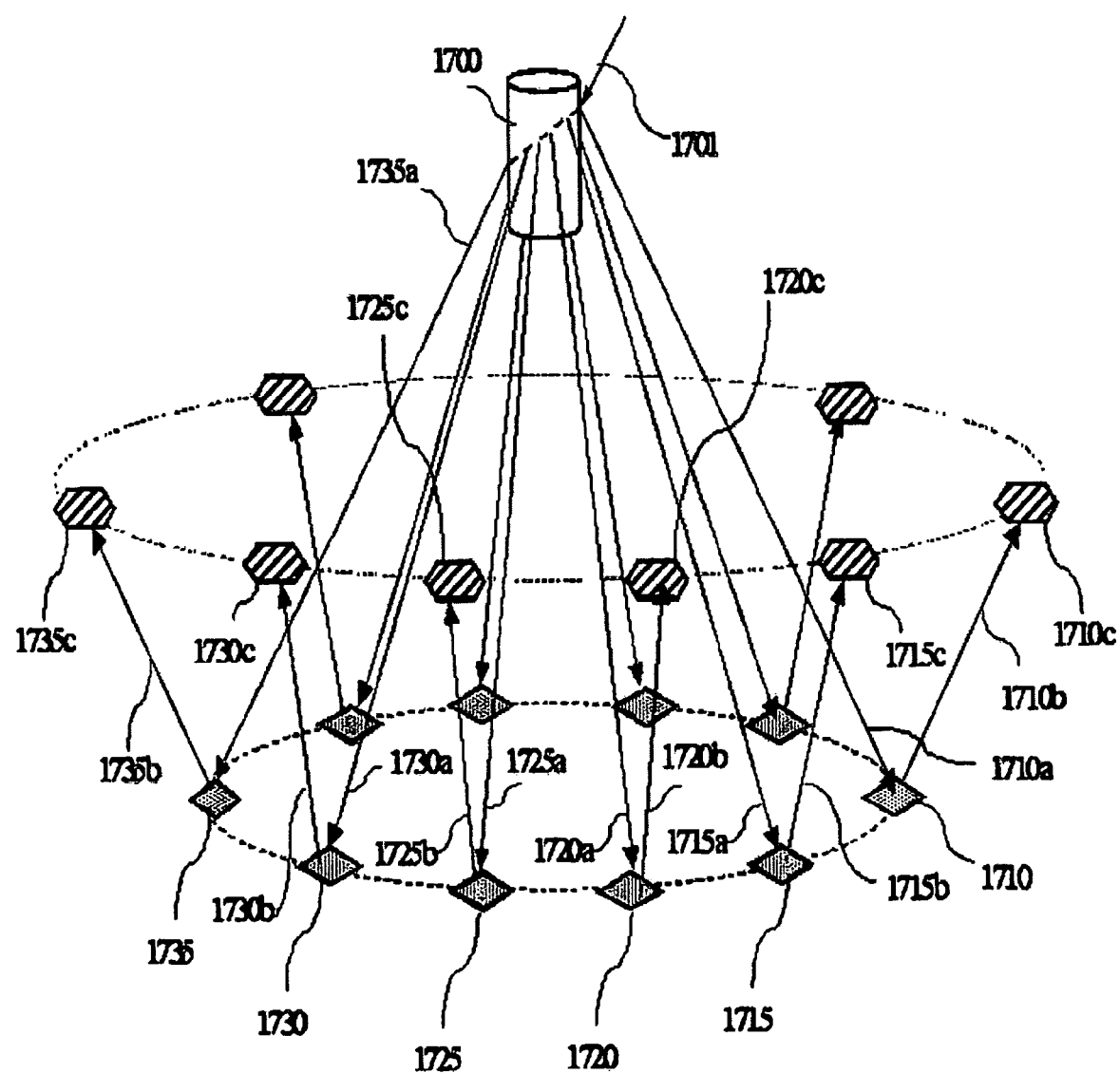
FIG. 25 shows a security system using a conical beam according to another embodiment of the present invention.

FIG. 25 shows a security system according to another embodiment of the present invention. Referring to FIG. 25, a laser beam 1701 is incident on a cylindrical prism 1700 and reflected by the cylindrical prism or transmitted through the cylindrical prism, to generate a conical beam 1710a, 1715a, 1720a, 1725a, 1730a and 1735a. The conical beam is reflected by beam path converters 1710, 1715, 1720, 1725, 1730 and 1735 so that parts of the conical beam are propagated to signals detectors 1710c, 1715c, 1720c, 1725c, 1730c and 1735c that are located at predetermined positions. If there is an intruder between the beam path converters and the signal detectors, a specific part of the reflected beam is not detected by a corresponding signal detector. Thus, the intruder can be confirmed.

Figure 26:
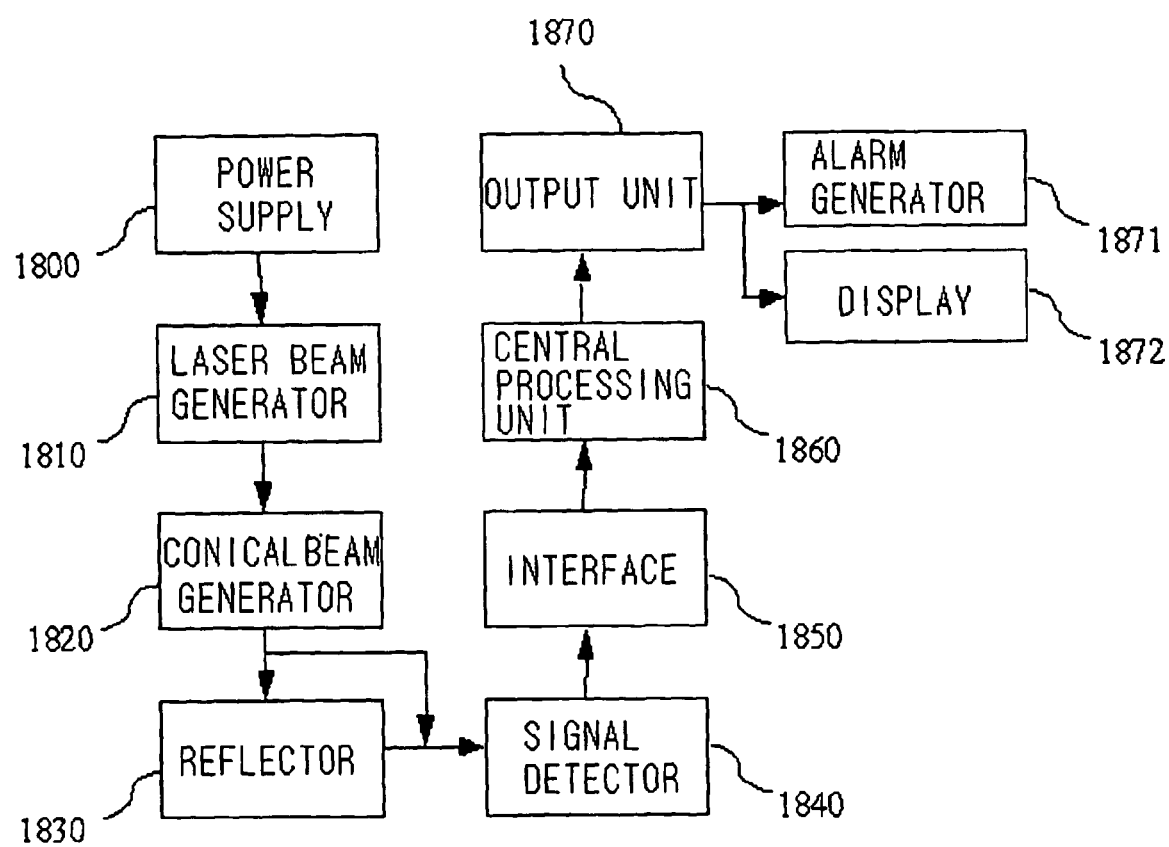
FIG. 26 is a block diagram of the security system using a conical beam according to the present invention.

FIG. 26 is a block diagram of the security system using a conical beam according to the present invention. The security system includes a laser beam generator 1810, a conical beam generator 1820, a signal detector 1840, a central processing unit 1860 and an output unit 1870.

The laser beam generator 1810 includes a power supply 1800. A laser beam generated by the laser beam generator 1810 is converted to a conical beam through the conical beam generator 1820. The security system further includes a reflector 1830 for reflecting the conical beam generated through the conical beam generator 1820. A corner cube is generally used for the reflector because the corner cube can be easily installed. However, other optical elements can be also used for the reflector only if they can reflect the conical beam. A reflective beam reflected by the reflector 1830 is incident on the signal detector. A light-receiving element is used as the signal detector 1840. A signal generated by the signal detector 1840 is transmitted to the central processing unit 1860 through an interface 1850. The central processing unit 1860 is programmed such that it detects an intrusion in a monitored area using the signal transmitted from the signal detector 1840. The output unit 1870 can include an alarm generator 1871 and a display 1872.

INDUSTRIAL APPLICABILITY

As described above, the present invention can convert a laser beam traveling straight and having a specific width to a plane beam or a conical beam propagated in all directions using a cylindrical prism. The plane beam or conical beam can be used in various applications. Especially, the plane beam or conical beam can be usefully used as a light source of a security system.

A conical beam generating apparatus of the present invention can vary the vertical angle of a conical beam and an incident angle of the conical beam by controlling an incident angle of a laser beam incident on the cylindrical prism. Furthermore, laser beams having various forms such as circular, oval, parabolic, hyperbolic and straight forms can be generated by controlling a setting angle of a screen located in front of the cylindrical prism.

When a security system employing the plane beam or conical beam generating apparatus of the invention is used to detect an intrusion, the entire area on a plane can be monitored. Accordingly, intrusion detection can be easily carried out at a low cost. Moreover, the security system does not require a separate driver so that the system maintenance is easy and the expected life span of the system is improved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A security system using a cylindrical prism, comprising:
   a plane beam generator using a hollow cylindrical prism with a predetermined diameter;
   a signal detector (1240) located a predetermined distance from the plane beam generator and detects a plane beam generated by the plane beam generator;
   a central processing unit (1260) for judging whether there is an intrusion from a signal detected by the signal detector; and
   an output unit (1270) for outputting the judgment result of the central processing unit.

2. A security system using a cylindrical prism, comprising:
   a plane beam generator using a hollow cylindrical prism with a predetermined diameter;
   a reflector (1230) for reflecting a plane beam generated by the plane beam generator;
   a signal detector (1240) for detecting a beam reflected from the reflector;
   a central processing unit (1260) for judging whether there is an intrusion from a signal detected by the signal detector; and
   an output unit (1270) for outputting the judgment result of the central processing unit.

3. A security system in which a plurality of security systems are respectively arranged on a plurality of planes to detect intrusions for the plurality of planes, wherein each of the plurality of security systems comprises:
   a plane beam generator using a hollow cylindrical prism with a predetermined diameter;

a reflector (1230) for reflecting a plane beam generated by the plane beam generator;

a signal detector (1240) for detecting a beam reflected from the reflector;

a central processing unit (1260) for judging whether there is an intrusion from a signal detected by the signal detector; and an output unit (1270) for outputting the judgment result of the central processing unit.

4. The security system as claimed in claim 2 or 3, wherein the reflector includes a corner cube to generate a reflective beam that is propagated in parallel with an incident beam incident on the corner cube.

5. A security system using a cylindrical prism, comprising:
a plane beam generating apparatus using a hollow cylindrical prism having a predetermined diameter; and
light-receiving elements for receiving a plane beam generated by the plane beam generating apparatus, the light-receiving elements are arranged in a row at one side such that they can receive the plane beam,
wherein intersecting points of the light-receiving elements and boundary lines (1301, 1302, 1303 and 1304) generated when an intruder (1300) blocks the plane beam are obtained, equations of the boundary lines are obtained from the position of the plane beam generating apparatus and the intersecting points, and positions (P1, P2, P3 and P4) at which the intruder meets the boundary lines are determined to obtain information about the intruder.

6. The security system as claimed in claim 5, wherein the security system employs two plane beam generating apparatuses, the equations of the four boundary lines are as follows $$y - d = \frac{d}{c - L_1}(x - c) \quad (a)$$

$$y - d = \frac{d}{c - L_2}(x - c) \quad (b)$$

$$y - b = \frac{b}{a - M_1}(x - a) \quad (c)$$

$$y - b = \frac{b}{a - M_2}(x - a) \quad (d)$$

(here, x is a definite straight line on which the light-receiving elements are arranged, y is an imaginary straight line perpendicular to the line x, (a, b) means x and y coordinates of one of the plane beam generating apparatuses, (c, d) means x and y coordinates of the other plane beam generating apparatus, $L_1$ and $L_2$ are intersecting points of boundary lines generated from one of the plane beam generating apparatuses and the line x, and $M_1$ and $M_2$ are intersecting points of boundary lines generated from one of the plane beam generating apparatuses and the line x), and the positions at which the intruder meets the boundary lines are determined from the equations (a), (b), (c) and (d) to obtain the information about the intruder.

7. The security system as claimed in claim 5 or 6, wherein the information about the intruder includes the size, moving speed and moving direction of the intruder.

* * * * *